July 14, 1953     H. H. NORMAN     2,645,252
SPRING FORMING MACHINE
Filed Oct. 24, 1947     10 Sheets-Sheet 8
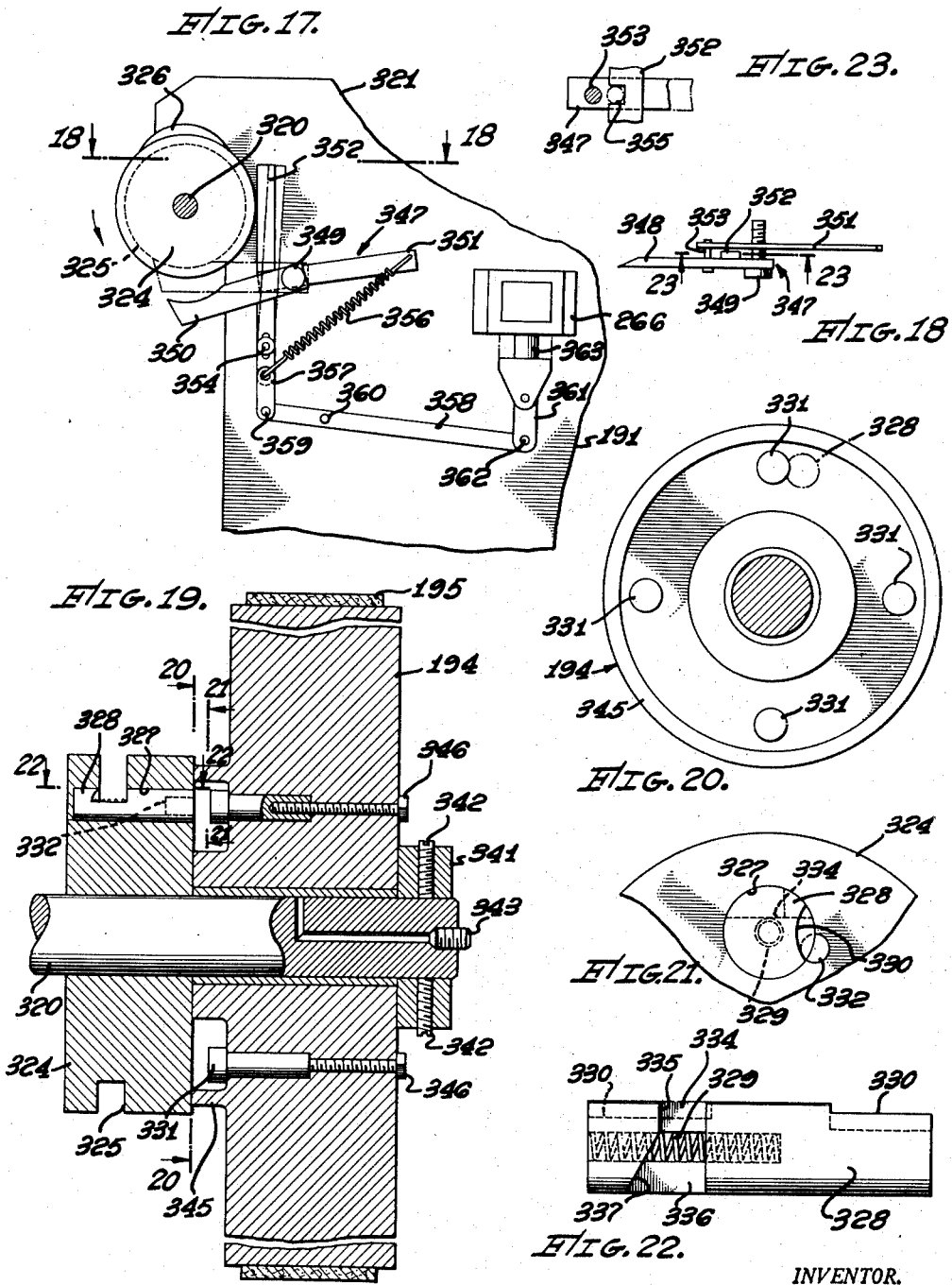

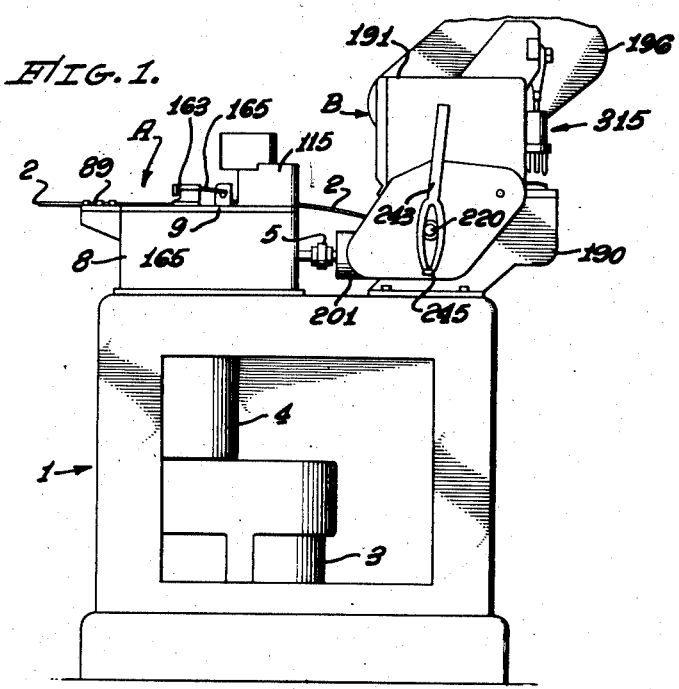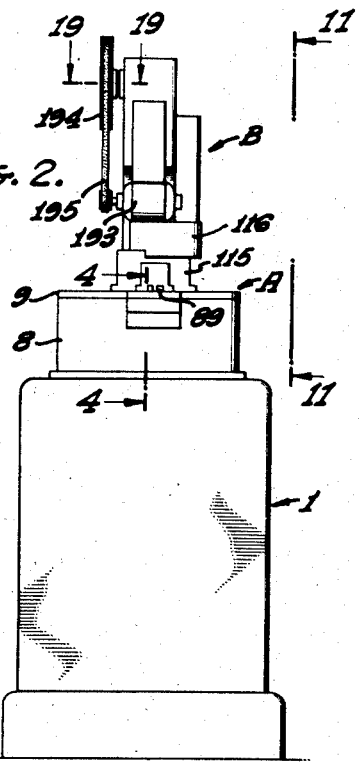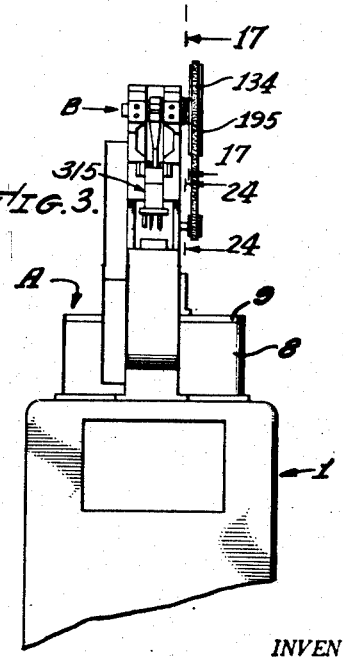

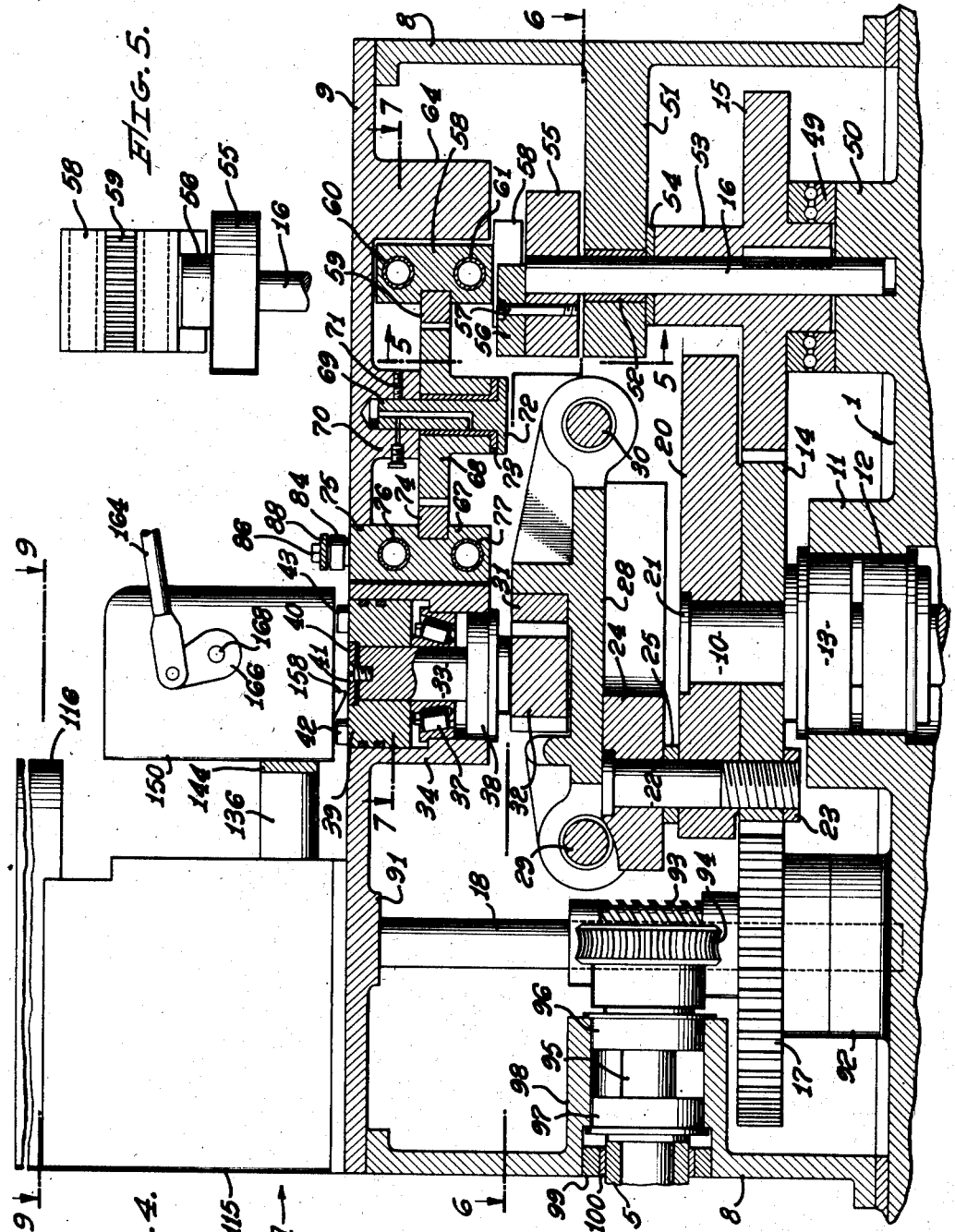

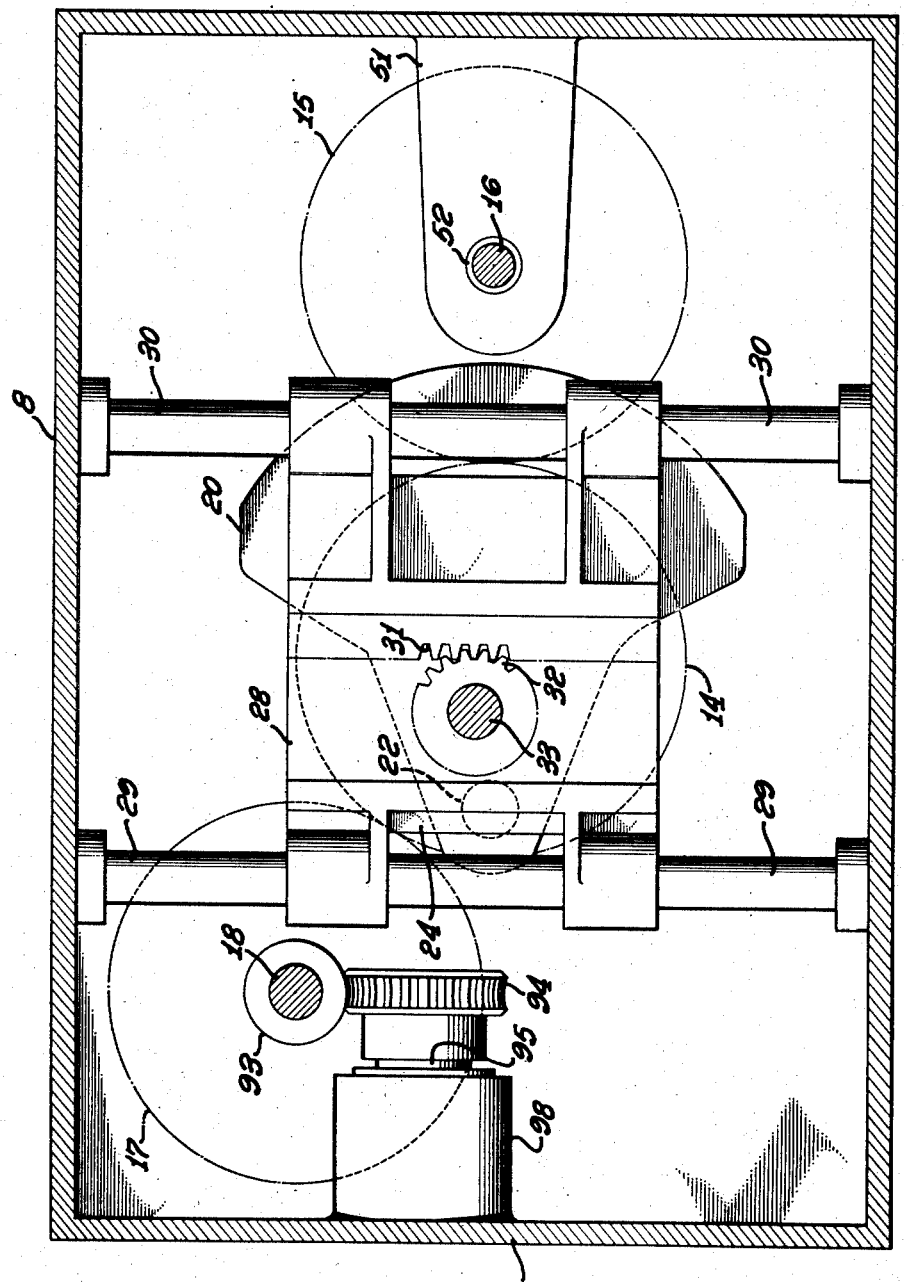

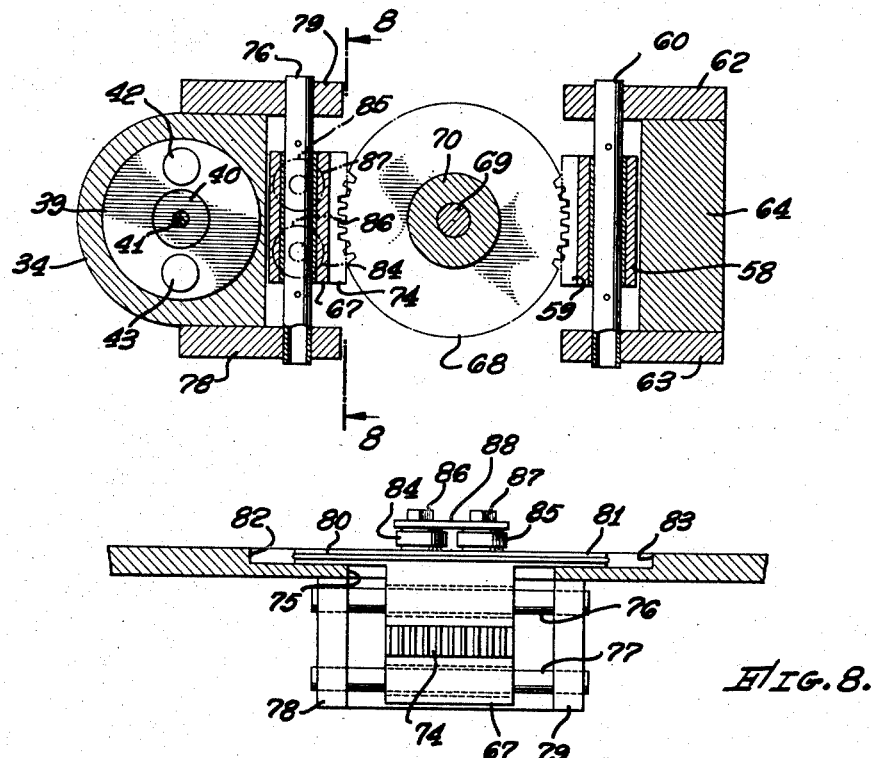
FIG. 7.
FIG. 8.
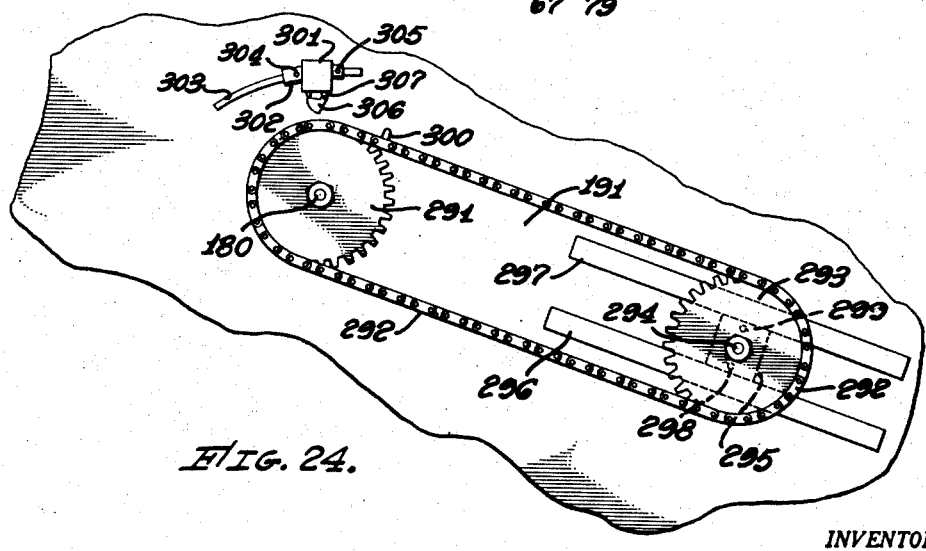
FIG. 24.
INVENTOR.
HARRY H. NORMAN,
BY
Hazard + Miller
ATTORNEYS.

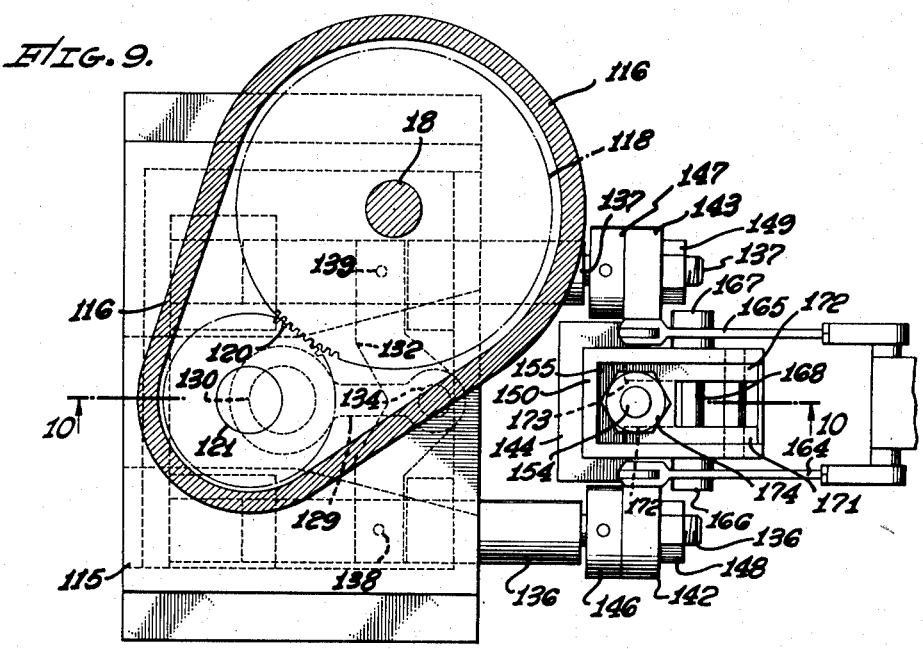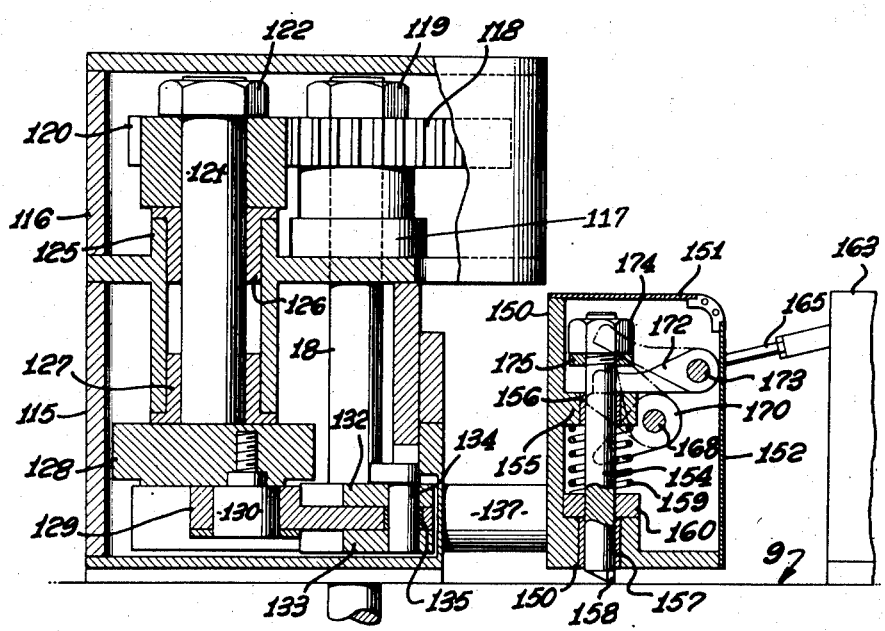

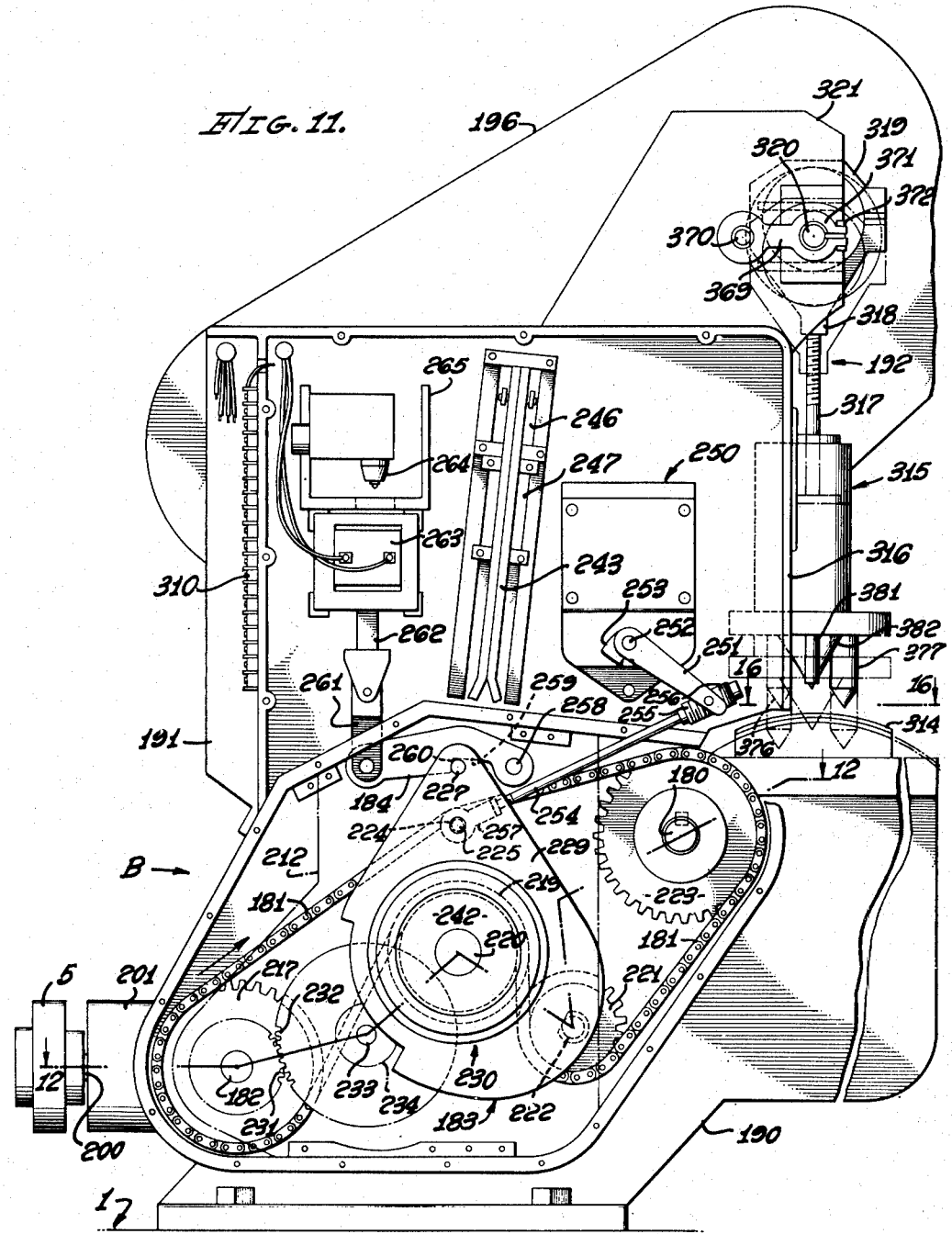

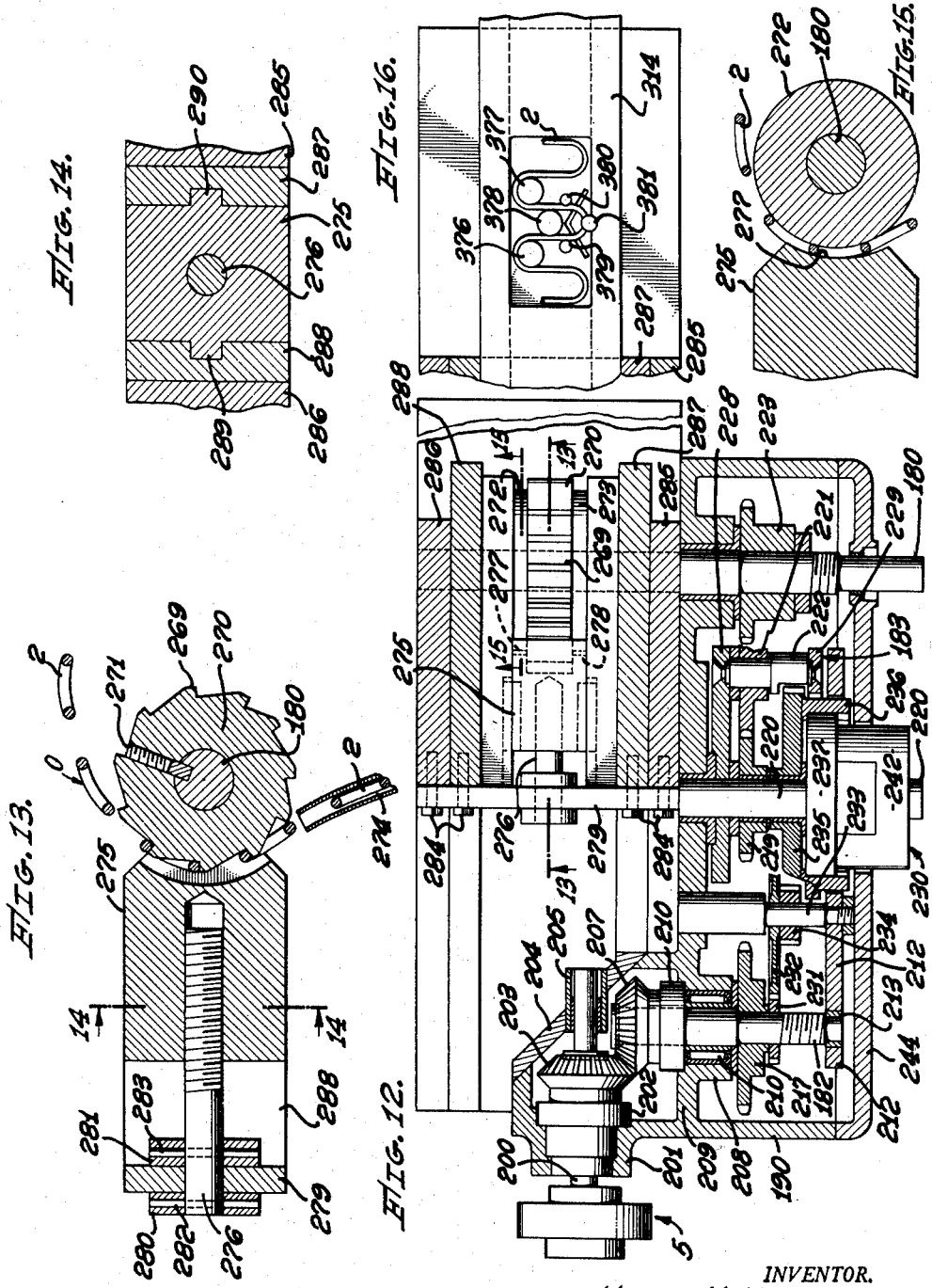

July 14, 1953 H. H. NORMAN 2,645,252
SPRING FORMING MACHINE
Filed Oct. 24, 1947 10 Sheets-Sheet 9

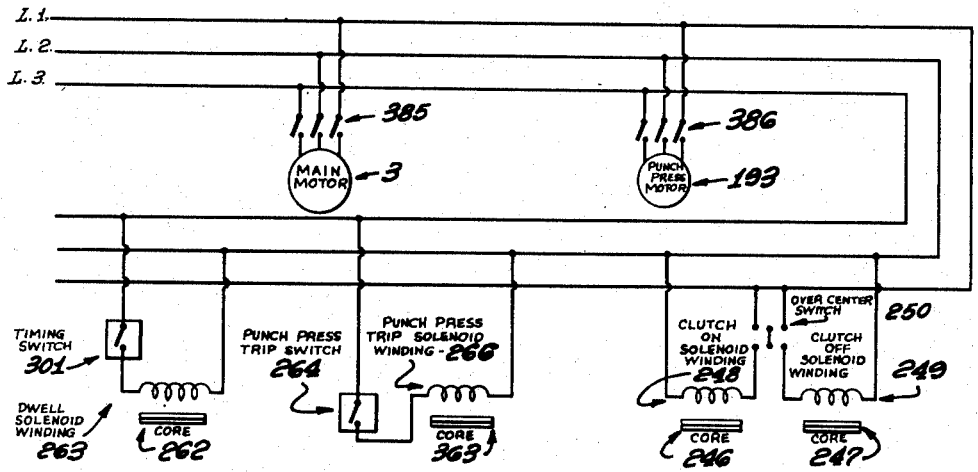

FIG. 25.

| | | BEGIN CYCLE | | BEGIN CYCLE | | BEGIN CYCLE | |
|---|---|---|---|---|---|---|---|
| TIMING SWITCH -301- | CLOSED | OPEN | | CLOSED | OPEN | | CLOSED |
| DWELL SOLENOID WINDING -263- | ENERGIZED | | | ENERGIZED | | | ENERGIZED |
| PUNCH PRESS TRIP SWITCH -264- | CLOSED | OPEN | | CLOSED | OPEN | | CLOSED |
| PUNCH PRESS TRIP SOLENOID WINDING -266- | ENERGIZED | | | ENERGIZED | | | ENERGIZED |
| DWELL FRAME -188- | ROTATING | ROTATING | AT REST | ROTATING | ROTATING | AT REST | ROTATING |
| CLUTCH ON SOLENOID WINDING -248- | | ENERGIZED | | | ENERGIZED | | |
| CLUTCH OFF SOLENOID WINDING -249- | ENERGIZED | | | ENERGIZED | | | ENERGIZED |

FIG. 26.

INVENTOR.
HARRY H. NORMAN,
BY
Hazard & Miller
ATTORNEYS.

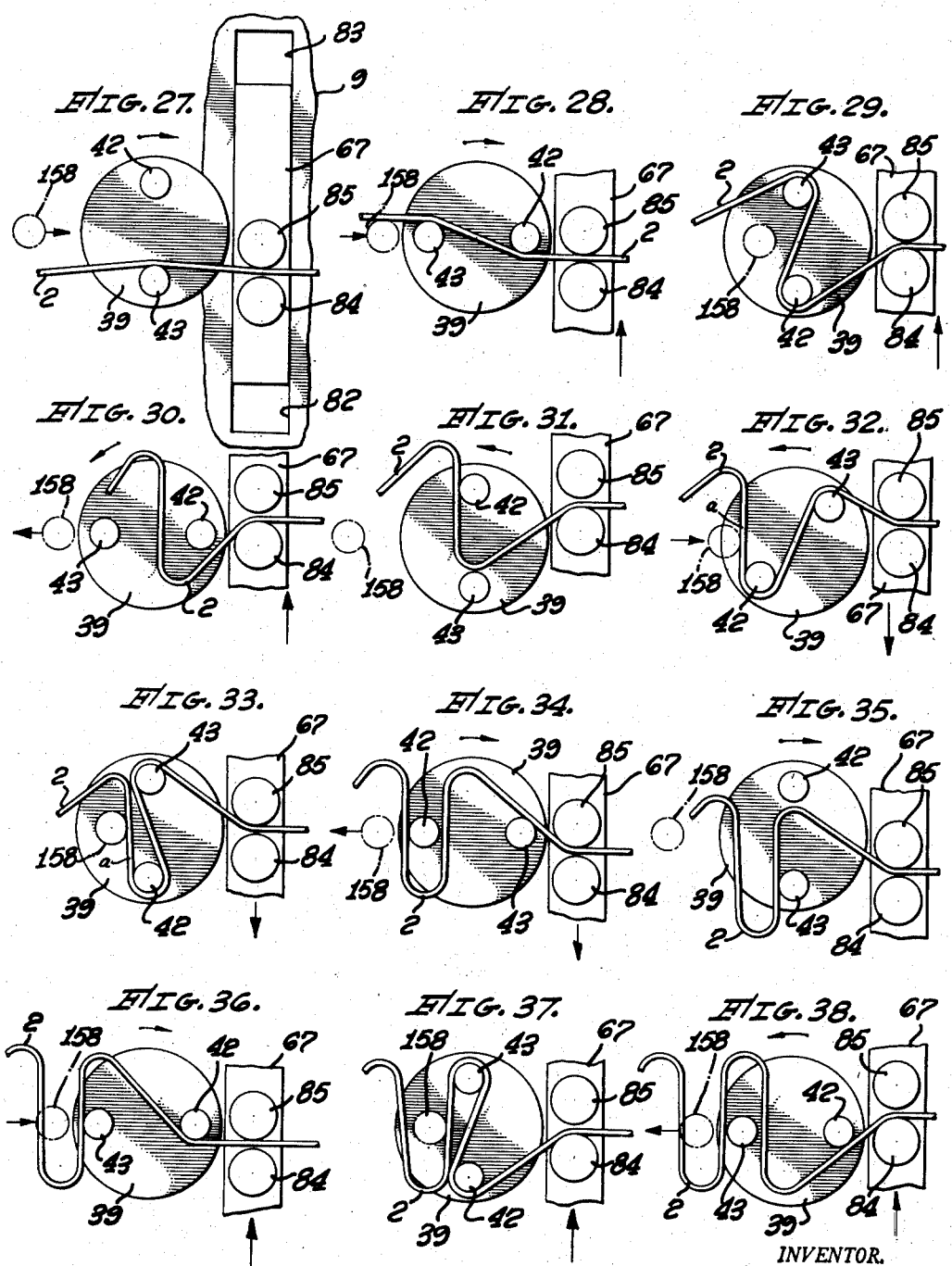

UNITED STATES PATENT OFFICE 2,645,252

SPRING FORMING MACHINE

Harry H. Norman, Los Angeles, Calif., assignor to Zig Zag Spring Co., Los Angeles, Calif., a corporation of California Application October 24, 1947, Serial No. 781,953

7 Claims. (Cl. 140—105)

This invention relates to a machine for performing operations upon material and in particular to a spring forming machine for forming sinuous or zigzag spring elements from spring wire, cutting the springs to predetermined lengths, forming the ends thereof to desired shape, and stressing the springs to provide a longitudinal set therein on an arc of predetermined radius. Various mechanisms disclosed herein are shown adapted to a spring forming machine of the above described type but it is to be understood that they are not limited to this type of machine but have uses in other types of machines which perform other kinds of operations.

There have been prior spring forming machines designed to form sinuous or zigzag wire from straight wire and it is a main object of this invention to provide a machine for bending straight spring or high carbon wire into the above named shape so as to form full lateral bends therein and to perform these operations in a faster and more efficient manner.

The application for U. S. Letters Patent filed by Andrew M. Zweyer, Serial No. 664,118, filed April 22, 1946, now Patent No. 2,582,576 discloses a wire forming machine having an oscillating platform with upstanding pins thereon for bending spring or high carbon wire into sinuous shape, and a reciprocating guide means so synchronized with the oscillating platform that when the platform is caused to move in a direction such that the pins thereon bend the spring wire, the reciprocating means is moved so as to aid the pins, and when the pins are moved in a direction as to retreat from a portion of the wire previously bent the reciprocating means is moved so as to cause the bent wire to move in a direction as to enable the pins to move around the previously bent portion of the wire and put a reverse bend in the wire stock. During the entire bending operation by the pins on the oscillating platform the wire already bent was not held and was allowed to move as it was forced to do by the oscillating pins. Under these conditions the oscillating pins by themselves could not overbend the wire because the wire was not held. Overbending of spring wire is necessary in order to form full lateral convolutes in the sinuously bent wire because spring wire has a large snap back. So, in order to form full convolutes in the spring wire, this prior machine was provided with a pair of alternately movable oscillating bending arms which were so operated that on alternate bending movements one or the other of the arms would be caused to move in after the oscillating pins had almost completed their bending functions and to further or over bend the wire to produce sinuous wire of proper shape.

Although the above device is an effective spring wire bending machine, it is one of the main purposes of this invention to eliminate the bending arms of the prior device and their bending functions, to provide a single movable retainer pin which is so operated as to track the oscillating pins during their complete bending operation and to so track these oscillating pins as to prevent the wire already bent from moving as occurred in the prior device. This construction allows the oscillating pins and the reciprocating feeding means which prebends the wire to perform the entire bending operation and overbend the wire to form full lateral sinuously shaped wire. Since the retainer pin of the present invention performs no bending operation, a simple bending process is obtained which is more accurate and controllable since a lesser number of elements take part in the bending operation.

It is another feature of this invention to provide a machine having operating means for operating on material, the operating means in the form of invention as disclosed in this application being cutting means, and providing delivering means for continuously delivering material to said machine where the material can be operated on and providing feeding means in said machine for continuously receiving the material in non-slack fashion, the feeding means being so designed as to feed the material step-by-step fashion through the machine and to provide a dwell or rest period during which the material may be operated on, a speed-up period during which the slow down of the material is made up and a period of normal speed during which the machine accepts the material in exact synchronism with the delivering means. Spring machines have heretofore been designed with one unit for continuously bending wire and a second unit for cutting the bent wire into springs, the cutting unit being spaced from the bending unit a sufficient distance to provide slack in the bent wire and there is provided in these machines an intermittent advancing mechanism in the cutting unit which runs at a speed faster than the speed of the bending unit an amount such that the average velocity of one unit is approximately equal to the average velocity of the other unit and the overall effect is to have a somewhat continuous flow of wire; but the disadvantage of these machines is that the two units must be operated from different sources in order to have continuous flow from the bending unit and therefore the period of dwell and speed-up is furnished by a separate source. In order for such devices to be workable at all the cutting means must be very carefully designed and constructed and timed and even so the errors in such machines accumulate so that the cutting unit must be stopped for a while or the bending unit must be stopped for a while to allow the inaccuracies to be corrected. In the machine forming the present invention there are no accumulated errors since the bending unit and the cutting unit are at all times driven from the same source. Under normal speed conditions the bending unit and the cutting unit are driven at exactly the same speed and when there is a dwell or rest period for purposes of operating on the material or wire, provision is made to store the movement delivered from the one source during the rest period and to give the stored movement back during the speed-up period. This provision is exact with no accumulation of errors and although it is extremely accurate its design does not entail expensive construction as would be necessary in prior machines.

In addition to the above advantages, the construction of the present device eliminates the slack in the wire or material being treated therefore allowing a more compact machine.

It is another feature of this invention to provide a feeding apparatus in the feeding means for putting a longitudinal arc in the sinuously bent spring wire which is delivered from the wire bending apparatus. Spring wire or high carbon wire such as is bent in the machine constituting the present invention has a much higher yield point than ordinary wire and it is particularly difficult to put a permanent set in such wire, particularly when attempting to put a longitudinal arc in sinuously bent high carbon or spring wire because the resiliency of the spring wire under these conditions is at a maximum and while it will deform comparatively easy it is difficult to make a permanent set. The feeding apparatus of the present invention is so constructed that sinuously bent or high carbon wire is pulled through a narrow arcuate passage, formed by the hubs of a serrated wheel and a grooved concave bending shoe, so designed and constructed that when the bent wire is pulled through said passage the end U's or arcuate portions of the bent wire will be bent in an arc which is contained in a plane that is at right angles to the plane containing the arc or U put in the wire by the oscillating pins. Since there is a positive bending action at particular portions of the sinuously bent wire, the process is rendered accurately controllable so that a definite desired longitudinal arc may be put in the sinuously bent wire.

It is another feature of this invention to provide a machine having operating means for operating on material with feeding means for feeding the material in step-by-step fashion to the operating means so that there is a period of movement of the material followed by a period of rest, said machine having means for actuating the operating means in timed relation with respect to the step-by-step movement so that each actuation of the operating means occurs during a period of rest of the material, the feeding means and the means for actuating the operating means being so constructed that the time and therefore the length of the material between operations can be increased or decreased without altering the time of the period of rest. Specifically in a spring forming machine as disclosed herein such a construction allows the lengths of the springs cut from the bent wire stock to be varied without varying the length of time for the period of rest of the material. In the machine herein disclosed, the length of time during which feeding of the wire to the cutting means takes place may be varied to vary the length of wire cut, but the rest period during which cutting takes place may remain constant. Prior devices have been constructed with step-by-step movements so designed that the length of the wire cut can be varied but when the length of the wire is changed the period of rest of the material during which the cutting operation takes place is also changed thereby wasting time. It will be appreciated that with a machine as disclosed herein there is no such waste of time since it is only necessary to find the most desired time of operation of the cutting device and then to allow a definite minimum period of time of rest of the material for it to be operated on and maintain this period although the time during which the bent wire is moving between cutting operations may be varied at will to vary the length of the wire cut.

In order that these sinuous or zigzag springs give the maximum benefit from their construction, it is also necessary that a definite height of crown of the wire be obtained when fastening the springs to chairs, seats and the like. Users of these springs need different length springs because of the particular size and construction of the apparatus to which these springs are to be attached and this machine is so designed that any length of spring may be supplied by a manufacturer with the special type of end construction above referred to. This is accomplished by the combination of two different mechanisms within the machine, the feeding means for large adjustments which feeding means is so designed that a spring composed of any desired number of convolutes or bends may be formed, and retainer pin moving means for vernier adjustment which means varies the shape and therefore the length of the convolutes or bends in the springs, so that springs of any desired number of convolutes or bends may be obtained by the large adjustment provided by the feeding means and springs of a length between a spring of a said number of convolutes or bends and a spring of one convolute more or less may be obtained by the vernier adjustment provided by the retainer pin moving means. The vernier adjustment above referred to is obtained by so designing the means for moving the retainer pin that the path of movement of the retainer pin with respect to the oscillating platform may be moved toward and away from the oscillating platform without disturbing the manner of tracking of the retainer pin with respect the oscillating pins. When the retainer pin is adjusted so that its path is moved away from the oscillating platform, sinuous or zigzag bends will be formed having wider legs. Therefore larger convolutes and longer springs will be obtained. If the path of the retainer pin is moved closer, the converse is true.

The feeding apparatus of the present invention is also constructed that it may be adjusted when different size wires are bent and also when the retainer head is adjusted to allow for larger convolutes so that the cutting punch press will always cut the bent wire and form the particular type of end structure desired.

The preferred form of the present invention will be described in connection with the accompanying drawings:

Fig. 1 discloses a side view of the spring forming machine;

Fig. 2 discloses a front end view of the spring forming machine with the belt housing off showing the punch press flywheel;

Fig. 3 discloses a rear end view of the spring forming machine showing the punch press cutting mechanism, the machine having the belt housing off and showing the punch press cutter flywheel;

Fig. 4 is a section along lines 4—4 of Fig. 2 in the direction of the arrows disclosing in detail the wire bending apparatus of the spring forming machine;

Fig. 5 is a partial section view along lines 5—5 of Fig. 4 showing part of the reciprocating feeding means;

Fig. 6 is a sectional view along lines 6—6 of Fig. 4;

Fig. 7 is a sectional view along lines 7—7 of Fig. 4 in the direction of the arrows showing a plan view of the mechanism for reciprocating the reciprocating feeding means;

Fig. 8 is a sectional view along lines 8—8 of Fig. 7 in the direction of the arrows showing the reciprocating feeding means and the rack for driving it;

Fig. 9 is a view along lines 9—9 of Fig. 4 in the direction of the arrows showing a top view of the means for moving the retainer pin;

Fig. 10 is a sectional view along lines 10—10 of Fig. 9 in the direction of the arrows showing a side view of the means for lifting and moving the retainer pin;

Fig. 11 is a side view along lines 11—11 of Fig. 2 with the covers removed from the machine showing the dwell mechanism and the latch and clutch actuating solenoids;

Fig. 12 is a sectional view along lines 12—12 of Fig. 11 in the direction of the arrows showing the dwell mechanism;

Fig. 13 is a sectional view through lines 13—13 of Fig. 12 in the direction of the arrows showing the serrated wheel for delivering bent wire to the punch press cutter mechanism and also the arcuately hollowed shoe for putting a longitudinal arc in the bent spring wire;

Fig. 14 is a sectional view along lines 14—14 of Fig. 13 showing the method of adjusting the arcuate shoe;

Fig. 15 is a sectional view along lines 15—15 of Fig. 12 showing how the longitudinal arc is put in the sinuously bent wire;

Fig. 16 is a view along lines 16—16 of Fig. 11 showing the bent wire in place for cutting and end forming operations;

Fig. 17 is a sectional view along lines 17—17 of Fig. 3 showing the means for connecting the flywheel to the punch press cutter;

Fig. 18 is a top view along lines 18—18 of Fig. 17 showing the knife cam construction;

Fig. 19 is a sectional view along lines 19—19 of Fig. 2 showing the flywheel and punch press wheel and the dog for connecting the two;

Fig. 20 is a sectional side view along lines 20—20 of Fig. 19 in the direction of the arrows showing the dog of the punch press engaged with one of the dogs of the flywheel;

Fig. 21 is a sectional view along lines 21—21 of Fig. 19 showing the specific construction of the punch press dog;

Fig. 22 is a sectional view along lines 22—22 of Fig. 19 disclosing another view of the specific construction of the punch press dog;

Fig. 23 is a sectional view along lines 23—23 of Fig. 18 showing the pin and notch arrangement of the knife cam and vertical link;

Fig. 24 is a sectional view along lines 24—24 of Fig. 3 showing the timing sprocket apparatus;

Fig. 25 is a schematic circuit diagram of the spring forming machine;

Fig. 26 is a timing diagram showing the sequence of events during the operation of the dwell cutting apparatus; and Figs. 27 through 38 show the sequence of stages during which wire stock is bent into sinuous or zigzag shape.

The spring forming machine of the present invention is disclosed generally in Figs. 1, 2 and 3 and comprises a frame 1 on which is mounted a wire bending apparatus generally entitled A which receives spring wire 2, bends the wire and continuously delivers the bent wire 2 to a dwell and cutting apparatus generally entitled B which apparatus is mounted on frame 1 next to the wire bending apparatus A and adapted to continuously receive the bent wire. The power for operating the wire bending apparatus and the dwell mechanism in the dwell and cutting apparatus B is derived from a motor 3 located inside frame 1 and power is transmitted from this motor through variable drive 4 to the wire bending apparatus A and power is transmitted from the wire bending apparatus to the dwell and cutting apparatus B by means of a coupling 5. The power for the cutting mechanism of the dwell and cutting apparatus B is derived from a separate motor mounted on the dwell and cutting apparatus.

The wire bending apparatus

This apparatus shown generally in Figs. 1, 2 and 3 and more in detail in Figs. 4 through 10 comprises a housing 8 with a cover 9, see Fig. 4, and a power shaft 10 transmitting power from motor 3 to the wire bending apparatus A.

This power shaft transmits power to three different mechanisms within the wire bending apparatus, A, namely to an oscillating platform on which the bending pins are mounted, to a reciprocating wire guiding means and to a retainer pin moving means. It also transmits power to the dwell mechanism of the dwell and cutting apparatus B, through coupling 5 as set out above. Since the above named four units are connected to the same power shaft they are in synchronism with one another, the oscillating platform, the reciprocating wire guiding means and the retainer pin moving means are synchronized to enable them to cooperate with one another to bend wire and the dwell mechanism is synchronized to enable it to receive the bent wire from the wire bending apparatus B in non-slack fashion.

Power shaft 10 is mounted for rotation in bearings 12 and 13 in boss 11 on the frame 1. A spur gear 14 is fixedly mounted on power shaft 10 and meshes with spur gear 15 fixedly mounted on a shaft 16 which shaft transmits power to the reciprocating guiding means, and spur gear 14 also meshes with spur gear 17 which is fixedly mounted on a shaft 18 which transmits power to the retainer pin moving means.

A balancing flywheel 20 is fixedly mounted on the extreme end portion of power shaft 10 and has a fan shape as clearly shown in Fig. 6 for purposes to be described and said flywheel is retained on the power shaft by a collared portion 21 provided on power shaft 10. Power is transmitted from power shaft 10 to the oscillating platform 39 by means of a bolt 22 which is threaded through matched eccentric holes provided in spur gear 14 and flywheel 20 and fastened to said members by means of a nut 23 as shown in Fig. 4. A sliding member 24 is rotatably mounted on the upper end head of bolt 22 and properly recessed to receive the head of said bolt therein, said sliding member being separated from the balancing flywheel 20 by a collar 25. This sliding member 24 slides in a transverse groove or recess on the under side of a reciprocating yoke 28, said yoke being mounted on the spaced parallel bars 29 and 30, which bars are securely fastened inside of frame 8 at the end portions thereof as seen in Fig. 6. Balancing flywheel 20 is so assembled with respect to the reciprocating yoke 28 that when the yoke is in one extreme position the fan of the flywheel is in the other extreme position so that during reciprocation of the yoke there will be no unbalancing within the wire bending apparatus.

A rack 31 is provided on the upper surface of reciprocating yoke 28, see Fig. 4, and meshes with a spur gear 32 which is fixedly mounted on a shaft 33. Shaft 33 is rotatably mounted inside of an aperture boss 34 provided on cover 9 of housing 8 by means of tapered bearings 37 and 38, and shaft 33 has an oscillating platform 39 fixedly mounted on the upper end thereof and properly positioned thereon between the inner race of tapered bearing 37 and washer 40 beneath screw 41, said screw threading into shaft 33 as clearly shown in Fig. 4. Bending pins 42 and 43 are mounted in spaced relation on the top of platform 39. When power shaft 10 is rotated, slider 24 causes yoke 28 to move back and forth thereby oscillating shaft 33 with a simple harmonic motion and bending pins 42 and 43 contact straight wire stock 2 on opposite sides thereof and bend the wire into sinuous or zigzag shape, as shown in Figs. 27 through 38, and which operation will be described more in detail hereinafter.

As before mentioned, the spur gear 14 meshes with spur gear 15 so as to transmit power to the reciprocating guiding means and spur gear 15 is fixedly mounted on shaft 16, said shaft being rotatably mounted at its lower end in bearing 49 provided in boss 50 on frame 1. A ledge 51 extends from one side of housing 8 and is apertured to receive shaft 16 which shaft is bushed by sleeve 52 in the ledge to provide a second support for shaft 16. Shaft 16 is properly positioned and prevented from moving upwardly by a collar 53 and a washer 54, said washer being positioned next ledge 51 and said collar being pinned to shaft 16 to be positioned next to washer 54.

Disc 55 is fixedly mounted on the end of shaft 16 protruding through ledge 51 and carries sliding member 56 rotatably mounted by means of a pin 57 on disc 55 so as to be eccentric with respect the axis of shaft 16. Sliding member 56 is contained within a reciprocating yoke 58 which carries a rack 59, said reciprocating yoke and rack being slidably supported on tubes 60 and 61 which are fixedly mounted at their ends in plates 62 and 63, said plates being fastened to a ledge 64 provided on the inner surface of cover 9. See Fig. 7. Rack 59 meshes with a spur gear 68 which gear is rotatably mounted on a shaft 69, said shaft being fixedly mounted in a boss 70 provided on the inner surface of cover 9 by means of a screw 71 and shaft 69 has a flange portion 72 for preventing gear 68 from moving downwardly, said gear being properly bushed on said shaft by a collared sleeve 73. Spur gear 68 also meshes with a rack 74 mounted in rack holder 67 which rack holder is slidably mounted in a slot 75 in cover 9 by tubes 76 and 77 which are fixedly mounted at their ends in plates 78 and 79 (see Fig. 7) which plates are fastened to the flat sides of boss 34. Rack holder 67 is provided with ears 80 and 81 which ride in grooves 82 and 83 provided in the top surface of cover 9.

Guiding rollers 84 and 85 are rotatably mounted on bolts 86 and 87 which are securely threaded in rack holder 67 and these bolts are held in place at their outer ends by means of a plate 88 having spaced apertures through which said bolts pass. When power shaft 10 is rotated causing shaft 16 to be rotated, slider 56 causes yoke 58 to be reciprocated which yoke in turn reciprocates rack 59 which in turn reciprocates rack 74 through spur gear 68 so that when wire 2 is drawn from the wire supply, not shown, through tensioning and straightening buttons 89 of standard construction, see Fig. 1, to the guide rollers 84 and 85, said wire will be fed over said oscillating platform 39 and back and forth across said platform as it is operated upon by the bending pins 42 and 43 on said platform. The units are so assembled and the machine is so dimensioned that when the oscillating pins move to one of their extreme positions, the reciprocating guide means is in such a position with respect to said oscillating pins that the wire is pulled to such an angle with respect to the guide rollers 84 and 85, as can best be seen in Fig. 29, that a slight bend or what is termed a prebend is put in a portion of the wire preceding the portion of the wire which is being operated on by the bending pins 42 and 43. The spacing of the oscillating platform 39 with respect the reciprocating guide means and the size of the guiding rollers 84 and 85 are such that the prebend is put in a portion of the wire so spaced from the portion of the wire which the oscillating pins are bending that when the oscillating pins retreat from the portion of the wire just bent, one of the bending pins draws the wire through the guide rollers 84 and 85 a distance such that the other oscillating pin moves exactly into the prebent portion and a reverse bend is put in the wire.

As before mentioned, spur gear 14 also meshes with a spur gear 17 for transmitting power to the retainer pin moving means. Gear 17 is fixedly mounted on shaft 18, an upper portion of said shaft being rotatably mounted in a boss 91 provided on the inner surface of cover 9 and the lower end of said shaft being rotatably mounted in boss 92 provided on frame 1.

Means are provided for transmitting power from shaft 18 outside of the wire bending apparatus to the dwell mechanism of the dwell and cutting apparatus B and this means comprises a worm 93 which is fixedly mounted on shaft 18 and located above spur gear 17. This worm meshes with a worm gear 94 which is mounted on the end of shaft 95, said shaft being rotatably mounted by means of bearings 96 and 97 in boss 98 provided on the end of housing 8. Shaft 95 has an oil retainer unit composed of sleeves 99 and 100 within the outer end of boss 98. One side of coupling 5 is fixedly fastened to shaft 95, said coupling transmitting power to the dwell part of the dwell and cutting apparatus B.

Shaft 18 passes from housing 8 into housing 115, see Fig. 10, and through said housing into a gear housing 116 and is supported in said gear housing by boss 117 provided on the bottom surface of said gear housing. The upper end of shaft 18 carries a spur gear 118 which is fixedly mounted thereon by keys, not shown, and positioned thereon by means of a nut 119 which threads on a threaded end of shaft 18. Spur gear 118 meshes with spur gear 120 which is fixedly mounted on a shaft 121 by means of keys, not shown, and is positioned thereon by means of a nut 122 which threads on the threaded end of shaft 121.

Shaft 121 is rotatably supported in gear housing 116 by means of a bushing 126, said bushing being contained within a boss 125 provided on gear housing 116. Shaft 121 is supported at a lower position by means of a second bushing 127 which is mounted in a lower extension of boss 125, see Fig. 10. Shaft 121 is equipped with a disc flywheel 128, on which is mounted in eccentric fashion a crank 129 by means of a collared screw 130, as best seen in Fig. 10. Disc flywheel 128 serves to balance the retainer unit during operation thereof. A crank arm composed of an upper wing shaped member 132 and a lower wing shaped member 133 is pivotally fastened to the free end of crank 129 by means of a pin 134 which is bushed to crank 129 by means of a sleeve 135. Upper portion 132 and the lower portion 133 of the crank are fastened at their ends to reciprocating shafts 136 and 137 each shaft having a reduced end and the ends of the wings of the crank members being shaped to fit over the reduced portions of said shafts and being connected thereto by pins 138 and 139, as best seen in Fig. 9. The opposite ends of shafts 136 and 137 are fixedly connected to ears 142 and 143 respectively which ears are provided on yoke 144 and said shafts are connected to said ears by means of adjusting screw collars 146 and 147 which thread on threaded end portions of shafts 136 and 137 respectively and also by means of nuts 148 and 149 which thread on the threaded end portions of shafts 136 and 137 respectively to clamp ears 142 and 143 between the adjusting screw collars and said nuts. A retainer housing is mounted within yoke 144 and comprises a base portion 150 and cover portions 151 and 152 and said retainer housing is fastened within the yoke 144 by means of screws, not shown, threaded into base portion 150.

Reciprocating retainer shaft 154 is movably supported within said retainer housing near one of its ends in base 150 by means of an apertured ledge 155 provided with a bushing 156 which fits around the shaft 154, and said retainer shaft is movably supported near the other of its ends in the aperture provided on the lower enlarged portion of base 150, said lower portion being provided with a bushing 157 fitting around shaft 154.

Retainer shaft 154 has its lower end beveled and undercut to form a retainer pin 158 the functions of which will be described hereinafter. A spring 159 is fitted around retainer shaft 154 and enclosed by ledge 155 at its upper end and the enlarged portion of base 150 at its lower end and rests on a collar 160 fixedly mounted on retainer shaft 154, this spring serving to force the retainer shaft downwardly.

A cam arrangement is provided for lifting the retainer pin 158 at proper intervals for reasons to be explained and this arrangement comprises a stationary member 163 mounted on cover 9 of housing 8 and from this stationary member extends crank arms 164 and 165 which are pivotally connected to said stationary member, see Figs. 1 and 4. Cranks 166 and 167 are pivotally connected to crank arms 164 and 165 respectively and these cranks are fixedly mounted on the ends of shaft 168 which is rotatably mounted in the sides of base member 150. Cranks 170 are fixedly mounted adjacent the ends of shaft 168 and positioned within the retainer housing base 150. These cranks ride under cranks 171 and 172 respectively, said last named cranks being movably mounted adjacent the ends of a crank supporting shaft 173 which shaft is fixedly mounted at its ends in the sides of base member 150. A nut 174 is threaded on the upper end of retainer shaft 154, as seen in Fig. 10, and a washer 175 is positioned on said shaft under said nut. Cranks 171 and 172 are positioned between cranks 170 and washer 175. When power shaft 10 is rotated so as to rotate shaft 18 which in turn cause shafts 136 and 137 to reciprocate thereby reciprocating the retainer housing 150, the forward movement of said housing will cause crank arms 164 and 165 to rotate cranks 170 so that the ends of said cranks will move upward and push the ends of cranks 171 and 172 which will in turn press against washer 175 and thereby pushing retainer shaft 154 upward against the resistance of spring 159 for reasons to be explained.

As before stated, the movement of the retainer pin 158 is synchronized with respect the movement of the oscillating pins because they both are directly connected to power shaft 10 and it has also been brought out hereinbefore that the oscillating bending pins 42 and 43 move with a rotational, simple harmonic motion. It is an important feature of this invention to so construct the retainer pin moving means and to so assemble the machine that the retainer pin 158 is moved during a bending operation to track or follow one bending pin when the platform moves in one direction and the other bending pin when the platform moves in the other direction so as to clamp a portion of the previously bent wire between it and the pin which it is tracking during the bending operation to permit the oscillating bending pins to overbend the wire to thereby form full convolutes in the wire and permit the oscillating bending pins together with the reciprocating feeding means to perform all the bending operation. The tracking above referred to as regards the specific machine disclosed herein does not mean that the retainer pin moves in an arc to follow each oscillating pin because the retainer pin is constrained to move in a straight line toward the center of the oscillating platform although the movement of the retainer pin is not limited to straight line movement. The tracking above referred to is used in the sense that the retainer pin closely follows the oscillating pin in its movement in the same direction as the retainer pin is moving. In other words, when the oscillating pin is moving, as depicted in Fig. 32, it has a movement vector parallel to the movement of the retainer pin and a movement vector at right angles to the line of movement of the retainer pin, and the retainer pin tracks each oscillating pin with respect its movement in the direction of its retainer pin vector. There is no bending by the retainer pin since the construction and assembling of the parts are such that the retainer pin moves from its backward position, see Fig. 31, quickly toward the oscillating platform while in its raised position and descends because of the forward movement of the retainer housing, as can best been seen from Fig. 4, permits the crank arms 164 and 165 to allow crank 167 to move downwardly which movement is helped by spring 159. As seen in Fig. 32, the retainer pin 158 has moved toward oscillating bending pin 42 and the two pins move with the same velocity toward the reciprocating guiding means, as can best be seen by comparing Figs. 32 and 33. As can be seen from Fig. 36, the raising of retainer pin 158 permits it to pass over the previously bent portions of the wire and insert itself within the next convolute so that it may again clamp a portion of the wire between it and alternate oscillating pins to permit the pins and the reciprocating means to form full convolutes in said wire. By reference to Figs. 32 and 33, it will be noted that the portion marked a which is clamped between the retainer pin 158 and oscillating pin 42 is not bent but merely held so as to prevent the sinuously bent wire from weaving and thereby allowing the oscillating pins to perform their bending operation. It is to be noted that retainer pin 158 is caused to track a vector of a simple harmonic motion and this tracking is possible with a crank and crank arm arrangement as is provided in this invention to move the retainer pin, only by choosing a particular ratio of length of crank to length of crank arm with respect the radius of the oscillating pins from their axis of oscillation. By experiment one such relationship can be obtained in which the retainer pin most closely tracks each oscillating pin and when this relationship is found there will be no bending of the wire between the retainer pin and the oscillating pin which it tracks because the retainer pins moves with the oscillating pin which it tracks.

*Operation of the wire bending apparatus*

The operation of this device will be described in particular with respect to Figs. 27 through 38 and in Fig. 27 it can be seen that the reciprocating guide means is approximately in one of its extreme outward positions and the wire 2 is being fed through the guide means and against the oscillating pin 43. Retainer pin 158 under these conditions is performing no operation on the wire since there is no previously bent wire to operate on. In Fig. 28, the reciprocating means has moved in the direction of the arrow and the oscillating platform has moved in the direction of its arrow so that the oscillating pins are just beginning to bend the wire and the retainer pin 158 is still performing no operation on the wire because there is no bent wire to operate on. In Fig. 29, the bending pins 42 and 43 have moved to one extreme position and the reciprocating platform is still moving in the direction of its arrow and in this position a convolute is being put in the straight wire 2 and a prebent is being put in the portion of wire 2 by the reciprocating guide rollers. In Fig. 30, the reciprocating guide means is moving the wire 2 with the bend therein in the direction of its arrow and the bending pins 42 and 43 are retreating from the previously bent portion of the wire and retainer pin 158 is moving outward in the direction of its arrow. In Fig. 31 it can be seen that the reciprocating means has moved the wire into such a position as to allow bending pin 43 to move around the convolute and bending pin 42 is contacting the lateral portion of the convolute and in the act of drawing wire 2 through the reciprocating guide means which operation draws the prebent portion out. As can be seen in Fig. 32, bending pin 43 just fits in the prebent portion and is moving in the direction of the arrow to put a reverse convolute in the wire. In this stage the retainer pin has moved in and to such position as to clamp the lateral portion of wire 2 between it and bending pin 42 to prevent the end of the wire from weaving. In Fig. 33, the retainer pin 158 and the bending pin 42 have moved together in the direction of the movement of the bending pin to hold the lateral portion of the bent wire between them and it can be seen that bending pins 42 and 43 are allowed to overbend the spring wire and the position of the reciprocating guide means, which is moving in the direction of its arrow, is such as to put a prebent in the portion of the wire between the feeding rollers 84 and 85. In Fig. 34, the reciprocating guide means is continuing to move in its direction as it was moving in Fig. 33 so that pin 42 may move around the convolute which is put in the wire and retainer pin 158 is moving back and about to move upwardly. In Fig. 35, the reciprocating guide means has moved to allow pin 42 to move around the convolute which is formed and bending pin 43 is in the act of drawing wire through the guide rollers 84 and 85 to permit bending pin 42 to move into said prebend. In Fig. 36, the retainer pin in its upward position is passing over the lateral portion of the convolute previously formed and it can be seen that pin 43 has drawn the wire 2 through the rollers 84 and 85 to such a position that bending pin 42 may move therein into the prebent portion. In Fig. 37, the retainer pin 158 has been moved inwardly and downwardly and followed pin 43 to clamp a lateral portion of a convolute between it and said pin to allow bending pin 43 and bending pin 42 to overbend the wire. In Fig. 38, the reciprocating guide means is moving as indicated to permit bending pin 43 to move around the convolute and allow bending pin 42 to contact the lateral portion in the convolute to draw the wire through the guide rollers 84 and 85 and retainer pin 158 is being moved outwardly and upwardly and will insert itself when moved inwardly again in the convolute in which bending pin 43 is shown positioned in Fig. 38 thus completing a working cycle of operation commenced in Fig. 30. It will be noted that in Figs. 27 through 38 that the overbend put in the wire, as in Fig. 37, by the bending pins springs out to a full convolute, as shown in Fig. 38, and from this the importance of the retaining pin will be realized since without it overbending would not be possible. It will also be noted that the distance across a convolute is not the same as the diameter of either of the bending pins because although the spring wire is bent around the pins, as shown in Fig. 37, the wire springs out and a radius is formed in the convolute which is larger than the radius of the bending pin.

In so far as the machine embodying the present invention relates to a machine for bending wire into sinuous form, its construction may be summarized as consisting of a frame or support on which spaced bending pins 42 and 43 are mounted for rotary oscillation about an axis disposed therebetween. A guide means 84 and 85 is mounted on the support in advance of the bending pins and guides the wire to be bent in a general direction toward the axis about which the pins 42 and 43 oscillate. Means is provided on the support for oscillating the pins 42 and 43 about the axis therebetween through arcs of approximately 360 degrees which arcs terminate approximately on a line transverse to the general direction of wire movement, as depicted in Figs. 29, 33 and 37. Means is provided on the support for transversely reciprocating the guide means 84 and 85 in timed relation to the oscillation of the bending pins and in such timed relation that during a portion of each reciprocation of the guide means 84 and 85 it is moving in a direction sympathetically with the bending pins, as depicted in Figs. 31, 34 and 35, but during the remainder of the reciprocation the guide means is moving in a direction opposed thereto, as depicted in Figs. 32 and 36. Behind the bending pins there is a retaining pin 158 which is movable toward and away from the axis of oscillation of the bending pins and into and out of the plane of oscillation of the bending pins. A means is provided on the support for moving the retaining pin 158 in timed relation to the oscillation of the bending pins so that the retaining pin moves toward the axis of oscillation and into the plane of oscillation of the bending pins to engage a convolution in the bent wire as it approaches completion. Thereafter the retaining pin recedes from the axis and from the plane of oscillation of the bending pins to enable the convolution to pass therebeneath. The single retaining pin is thus caused to engage each convolution as it approaches completion as depicted in Figs. 32 and 33 in one instance and in Figs. 36 and 37 in another instance.

The dwell and cutting apparatus

To more easily understand the specific description of this part of the spring forming machine a short general description will be given. The dwell and cutting apparatus B has a feeding means which is controlled by a timing sprocket apparatus having control shaft 180 on which shaft is mounted the timing sprocket apparatus for timing the length of the springs cut from the bent wire stock and a feeding apparatus for giving the bent wire stock a longitudinal arc and for feeding the bent wire stock under the cutting device.

A power transmission chain 181 is provided to transmit power from shaft 182 to control shaft 180, shaft 182 receiving power from coupling 5 through various gears, said power transmission chain being arranged to transmit power through a rotatably mounted dwell frame 183, about which said chain is so placed as to constantly urge said dwell frame to rotate, the placement of said chain also being such that when the dwell frame rotates no power is transmitted to control shaft 180. The dwell frame is prevented from rotating by means of a latch 184, which latch is controlled by a solenoid which is actuated by the timing sprocket apparatus. When shaft 180 has rotated to a position such as to operate the timing sprocket apparatus said apparatus energizes the solenoid which lifts the latch allowing the dwell frame to rotate under the urging of chain 181, whereby no power is transmitted to shaft 180 thereby stopping the timing sprocket apparatus and the feeding means to allow the bent wire to be cut while in a stationary position by the cutting mechanism. There is a clutch mechanism operated by the movement of the dwell frame 183 and when said dwell frame rotates to a predetermined position a clutch is engaged to transmit power through a gear train to rotate the dwell frame in the opposite direction to return it to its starting position. This clutch mechanism is so designed and adjusted with respect to the dwell frame that when the dwell frame reaches its starting position, the latch 184 can once more hold the frame, and the clutch is disengaged.

The dwell and cutting apparatus generally entitled B in Figs. 1, 2 and 3 is shown in detail in Figs. 11 through 24; in a schematic wiring diagram, as shown in Fig. 25; a timing diagram, shown in Fig. 26; and from Fig. 11 it can be seen that this apparatus comprises a base housing 190 mounted on frame 1 and containing the dwell mechanism, as shown in Figs. 11 and 13. Upon housing 190 is mounted an upper housing 191 which contains the clutch and latch operating mechanism. A punch press cutter mechanism generally entitled 192 is mounted on the front part of the upper housing 191 and is driven when connected by a small motor 193, see Fig. 2, which operates flywheel 194 through a belt 195 housed in belt housing 196, the motor being mounted near the back of housing 191 and the belt housing 196 being mounted on the top of housing 191, as shown in Fig. 11.

The dwell mechanism contained within base housing 190 receives power from coupling 5, said coupling having one end of a shaft 200 fastened therein, shaft 200 is rotatably mounted in an outwardly extending boss 201 provided on base housing 190, and provided with a bearing 202 see Fig. 12 to properly support and position it within boss 201. A beveled gear 203 is fixedly mounted at about the middle of shaft 200, the distal end of said shaft being rotatably mounted in an angular opening provided in cover 204 by means of a bushing 205. Power is transmitted from beveled gear 203 to shaft 182 by means of a beveled gear 207 which is mounted on one end of shaft 182, said shaft being rotatably mounted in a boss 208 provided in web 209 of base housing 190 by means of a bearing 210. The other end of shaft 182 is rotatably mounted in plate 212 by means of a bushing 213. Plate 212 is fixedly mounted to base housing 190 at various places around its edges to form a fixed support in which shaft 182 rotates and is shown in dot dash in Fig. 11.

A chain sprocket 217 is fixedly fastened to a reduced portion of shaft 182 and spaced from boss 208 by means of a collar. It will be seen that the bearing 210 and sprocket 217 and the collar position shaft 182 within boss 208.

Power is transmitted from shaft 182 through dwell frame 183 to control shaft 180 by means of power transmission chain 181 which passes around chain sprocket 217 over chain sprocket 219 mounted on dwell frame shaft 220, down under chain sprocket 221 which is rotatably mounted on idle shaft 222 which idle shaft is part of the dwell frame, up and over sprocket 223 fixedly mounted on control shaft 180, then back and over a rotating bushing 224 mounted on take up shaft 225 which is part of dwell frame 183, then back to chain sprocket 217. Power transmission chain 181 is rotated by shaft 182 in a clockwise direction as viewed in Fig. 11 so that power is transmitted on the lower part thereof thereby producing a force pulling up on idle shaft 222 tending to rotate dwell frame 183 counterclockwise, as seen in Fig. 11, said dwell frame being kept from rotation by latch 184 which is pivoted to the base housing 190, as shown in Fig. 11, and catches on shaft 227 which is part of the dwell frame 183, said dwell frame comprising plates 228 and 229 which are rigidly positioned in spaced relation by shaft 227, idle shaft 222 and take up shaft 225.

Once the machine is turned on, shaft 182 rotates constantly and it will be seen that when the dwell frame 183 is allowed to rotate under the influence of power transmission chain 181 the chain instead of rotating control shaft 180, which is prevented from creeping by a load to be described, will merely pull idle shaft 222 up straightening the bite in the chain between sprockets 219 and 223 around sprocket 221. The chain between sprockets 219 and 221 in effect stores up the movement which will be given back when the dwell frame is rotated in the reverse direction back to its starting point.

Shaft 182 besides having means for transmitting power to control shaft 180 has means for transmitting power to a clutch 230 by means of a spur gear train consisting of spur gear 231 fixedly mounted on shaft 182 next to chain sprocket 217, large spur gear 232 rotatably mounted on a reduced portion of a shaft 233, spur gear 234 rotatably mounted on shaft 233 and fastened to large spur gear 232 and large spur gear 235 which is rotatably mounted on dwell frame shaft 220 and fastened to a clutch cup 236 which cup is splined to the driving face 237 of clutch 230. Clutch cup 236 is rotatably mounted on dwell frame shaft 220 and is constantly driven once the spring forming machine is turned on by shaft 182 through coupling 5. Shaft 233 has one end thereof fixedly mounted in an opening provided in web 209 and the other end thereof is supported in plate 212.

The driven plate 242 of clutch 230 is splined on dwell frame shaft 220 so as to be rotatable therewith and this driven plate is moved back and forth on said shaft by clutch arm 243, see Fig. 1. Clutch arm 243 is pivoted at its lower end at 245 to cover plate 244 which is mounted on base housing 190, said pivot being located with respect to Fig. 12 directly below dwell frame shaft 220 as seen in Fig. 1 of the drawings. The middle of clutch arm 243 is bifurcated so as to straddle dwell frame shaft 220 and solenoid cores 246 and 247 are fastened one above the other on the other end of clutch arm 243, as can be seen by reference to Fig. 11, and these cores are affected alternately by solenoid windings 248 and 249, solenoid winding 248 being the clutch-on solenoid winding and solenoid winding 249 being the clutch-off solenoid winding which windings can not be seen in Fig. 11 but are positioned directly back of the solenoid cores 246 and 247 and fixedly mounted on the upper housing 191. The energization of these solenoid windings is controlled by an over-the-center switch 250 which has a snap action so that it energizes one or the other solenoid winding 248 or solenoid winding 249 at all times when the spring forming machine is turned on. The clutch-on solenoid winding 248 when energized positively engages the clutch plates and the clutch-off solenoid winding 249 positively disengages the clutch plates.

When the clutch-on solenoid winding 248 is energized clutch arm 243 is pulled toward upper housing 191 and since the lower part of said clutch arm is pivoted to cover 244 the bifurcated portions thereof will cause the driven plate 242 of clutch 230 to bear against the driving face 237 of said clutch and since the driving face is constantly driven from shaft 182 the dwell frame 183 will be rotated in a clockwise position as viewed in Fig. 11.

Over-the-center switch 250 is fixedly mounted on upper housing 191 and is controlled by an arm 251 which is pivoted to the over center switch at 252, as shown in Fig. 11, and has a cam portion 253 extending therefrom to actuate over-the-center switch 250. The other end of arm 251 is pivotally fastened to long arm 254 by means of an adjustable connection comprising nuts 255 and 256 which are threaded on long arm 254 and serve to correctly adjust arm 251 along long arm 254 which adjustment insures that over-the-center switch 250 will properly energize the clutch-on solenoid winding 248 and the clutch-off solenoid winding 249. Long arm 254 is pivotally mounted on take up shaft 225 by means of a connection 257 into which it threads.

As before explained dwell frame 183 is held in place by a latch 184 and this latch is pivoted to base housing 190 by means of a bolt 258 which threads into said base housing. The latch has an undercut 259 of such length as to permit shaft 227 on dwell frame 183 to move slightly thereof for reasons to be explained. This undercut has a side 260 which is slanted at an angle which is sufficient to prevent shaft 227 from raising latch 184 and releasing itself. The other end of latch 184 is pivoted to link 261 which link in turn is pivoted to solenoid core 262, said core being movably mounted within dwell solenoid winding 263. A punch press trip switch 264 which is a microswitch is mounted on upper housing 191 within a frame 265 and when its contacts are closed current is allowed to energize a punch press trip solenoid winding 266, see Fig. 17, and schematic diagram, Fig. 25, which solenoid serves to connect flywheel 194 to a punch cutter wheel 324 to cause a spring to be cut from the bent wire stock.

The over-the-center switch 250 is so adjusted that when the dwell frame 183 is allowed to rotate upon the release thereof by latch 184 long arm 254 and the arm or crank 251 cause the switch 250 to be actuated. In one position of this switch, that is the position as shown in Fig. 11 of the dwell frame, the clutch-off solenoid winding 249 is energized to positively disengage clutch 230. In this position clutch-on solenoid 248 is not energized or is on open circuit. When the dwell frame has rotated from its position shown in Fig. 11, arms 254 and 251 cause switch 250 to reverse the connections. When the connections are thus reversed the clutch-on solenoid winding 248 is energized to engage the clutch and the clutch-off solenoid winding 249 is deenergized. The clutch will remain in engagement by reason of the continued energizing of the clutch-on winding 248 until the dwell frame returns to the position shown in Fig. 11, at which time the switch 250 restores the original connections wherein winding 249 is energized to positively disengage the clutch 230 and the clutch-on solenoid winding 248 is deenergized.

A feeding apparatus is provided in the spring forming machine and forms part of the feeding means of said machine. This feeding apparatus has two functions, one to put a longitudinal arc in the sinuously bent wire and secondly to feed the longitudinally and sinuously bent wire under the cutting punch press 192 to allow the press to cut off desired lengths of springs. The feeding apparatus, as best shown in Figs. 12 through 15 comprises a wheel 270 having teeth 269 so that said wheel closely resembles a ratchet wheel, said wheel being fixedly mounted as by a screw 271 on control shaft 180, as clearly seen in Fig. 13, and this wheel is provided with a hub 272 on one side of said wheel and a hub 273 on the other side of said wheel, said hubs having a diameter equal to the bottom tooth diameter of said wheel. A feeding tube 274 is mounted on base 190 and serves to properly guide the sinuously bent wire from the wire bending apparatus A to the feeding apparatus. A bending shoe 275 having a grooved arcuate concave surface is caused to be positioned by an adjusting screw 276 close to wheel 270 so that the grooved portion partially encloses the periphery of said wheel and so as to create narrow arcuate passages 277 and 278 between the hubs and the side portions of bending shoe 275. This arcuate passage can be increased or decreased by means of adjusting screw 276 and shoe 275 is so positioned with respect wheel 270 that the narrow arcuate passage thereof is such that the combined distances of the single thickness of the wire plus the distance of the chord of said arcuate passage taken at a radius equal to the radius of the hub plus the single thickness of the wire being bent is less than the longitudinal width of the arcuate portion of a convolute of the sinuously bent wire stock so that when the wire is pulled through said passage by the operation of control shaft 180 the arcuate portions or the end U's of the convolutes of the bent wire stock will be bent in an arc which is contained in a plane that is at right angles to the plane containing the arc or end U's put in the wire by the oscillating pins, as can be seen by reference to Fig. 13, end U labeled o. It will be appreciated that there is a load created by pulling the bent wire stock through the narrow arcuate passage and this load serves to hold control shaft 180 stationary during the dwell period so that it does not creep under the influence of power transmission chain 181.

Adjusting screw 276 is threaded within a threaded hole provided with shoe 275 and held by its free end in plate 279 by means of collars 280 and 281 which are pinned by pins 282 and 283 to adjusting screw 276 on opposite sides of plate 279, as shown in Fig. 13. Plate 279 is fixedly fastened by bolts 284 to double plates 285, 286, 287 and 288 which plates in turn are fixedly fastened to base housing 190 by means not shown. Bending shoe 275 is provided with guides 289 and 290 which slide within grooves provided on plates 287 and 288 and these guides and grooves serve to properly position the bending shoe 275 with respect wheel 270.

It can be seen with the above construction that when the narrow arcuate passage is varied, a very accurate control of the longitudinal arc put in the sinuously bent wire is obtained since there is no random bending operation but a positive contact bending process.

A timing sprocket apparatus, shown in Fig. 24, is located on the other end of shaft 180 and comprises a chain sprocket 291 which is fixedly mounted on shaft 180. A timing chain 192 is placed around sprocket 291 and also about a chain sprocket 293 which is rotatably mounted on a stub shaft 294 which shaft is fixedly mounted in block 295. Block 295 is mounted in a dovetail formed by guides 296 and 297 which guides are fixedly fastened to housing 191 and there are screws 298 and 299 for positioning the block along the groove, thus enabling links of the chain to be added or subtracted. This adjustment enables different lengths of springs to be cut from bent wire stock since the means for actuating the cutter is controlled by a cam 300 which is mounted on one of the links of the chain and each complete revolution of said chain causes the contacts of timing switch 301 which is a micro switch to be closed. When the contacts of timing switch 301 are closed current is allowed to flow to dwell solenoid winding 263 which lifts latch 184 thereby allowing the dwell frame to rotate and the energization of dwell solenoid winding 263 also causes the contacts of punch press trip switch 264 to be closed which contacts cause the punch press to move downwardly and cut the bent wire stock in a manner to be described. Timing switch 301 which is the main timing switch of the dwell and cutting apparatus is mounted on plate 302 which plate rides in arcuate groove 303 provided in upper housing 191 concentric with shaft 180 and screws 304 and 305 are provided in said plate to allow said timing switch to be adjusted about shaft 180. This adjustment is necessary when the thickness of the wire being operated on is changed so that the wire will be cut in the cutting mechanism in the proper place. It is apparent from Fig. 13 that wheel 270 will position a thinner wire slightly different from what it would position a thicker wire. This micro switch adjustment is also used when the path of retainer pin 158 is moved which movement of the retainer pin results in convolutes with wider legs and therefore adjustment would have to be made so that wheel 270 would position each convolute under the cutting head so that it would be cut properly.

Cam 300 may be of such nature and the timing sprocket apparatus so designed that it directly contacts timing switch 301 but it is preferred that a pivot plate 306 be pivoted to the micro switch at 307 and the cam contact the pivot plate which pivot plate in turn closes the timing micro switch contacts.

A lead box 310 is mounted in the rear of upper housing 191 and serves as a convenient place to which electrical connections within the dwell and cutting apparatus may be connected and, of course, to which the electrical supply cables from outside the dwell and cutting apparatus may also be connected.

The punch press mechanism generally entitled 192 in Fig. 11 is shown in dot dash lines in Fig. 11 in its lowered position and in full lines in its raised position and Fig. 16 shows a piece of sinuously bent wire 2 positioned in place on a cutting and bending table 314 in the process of being operated on. In this figure the dies and punches of a cutting head generally entitled 315 are shown in partially lowered position, said head having various dies and punches connected on the lower side thereof and this head is guided with guides 316 provided on upper housing 191, the upper end of said head being pivotally connected to a driving shaft 317, the upper end of said shaft being securely threaded into a bearing 318.

Bearing 318 is mounted about an eccentric 319 which eccentric is fixedly attached to or formed integrally with punch press cutter shaft 320. Punch press cutter shaft 320 is journaled within a top housing 321 which is fixedly mounted on upper housing 191. Near one end of shaft 320 is fixedly mounted the punch press cutter wheel 324, see Fig. 17, said wheel having a peripheral slot 325 formed therein and a cam surface 326 formed thereon. A hole 327 is provided in punch press cutter wheel 324, as seen in Fig. 19, and a punch press cutter dog 328 is contained within said hole. Punch press cutter dog 328 is shown in detail in Fig. 22 and has a central hole in which a spring 329 is enclosed, said spring serving to urge dog 328 out of hole 327. Punch press cutter dog 328 also has an arcuate cut out 330 which enables said dog to cooperate with the cylindrical surfaces of flywheel dogs 331 and punch press cutter dog is prevented from rotating in hole 327 by a small rod 332 which is fixedly mounted in punch press cutter wheel 324 and rides within a groove provided in dog 328, the groove being of sufficient length to allow dog 328 to freely move back and forth but not to rotate. Dog 328 has a slot 334 formed therein having a straight portion 335 and an angular portion 336, said angular portion being bounded on one side by angular side 337.

The flywheel 194 is freely rotatably mounted on the end of shaft 320 and positioned next to the punch press cutter wheel 324 and properly positioned on shaft 320 by a collar 341 which has screws 342 threaded therein and contacting shaft 320 and oil plug 343 is provided in the end of shaft 320.

Flywheel 194 has a reduced hub portion 345, said hub portion having an angular groove formed therein, as best seen by comparison of Fig. 19 to Fig. 20. Four flywheel dogs 331 are fastened in flywheel 194, as shown in Fig. 19, by means of screws 346. Flywheel 194 is, when the spring forming machine is turned on, at all times rotated by small motor 193 through belt 195 and freely rotates on the end of shaft 320 and its energy is transmitted to the punch press cutter head 315 through punch press cutter wheel 324 when dog 328 is allowed to come out of its hole so that it contacts one of the flywheel dogs 331.

The means for allowing dog 328 to come out of its hole is a link mechanism comprising a knife cam 347, as shown in Figs. 17 and 18, having a front beveled edge 348 which cam is of such size that it may ride within slot 325 and when positioned within slot 334 in dog 328 serves to prevent said dog from being forced out of its hole by the spring 329. Knife cam 347 is pivoted to housing 191 by means of a bolt 349 and said knife cam comprises two parts, front part 350 and back part 351 to enable a vertical link 352 to be positioned therebetween. The front part 350 and the back part 351 of knife cam 347 are fastened to one another by bolt 349, about which they freely pivot, and also by means of a pin 353, vertical link 352 being positioned between pin 353 and bolt 349, as shown in Fig. 18. Vertical link 352 is pivoted to housing 191 by means of a bolt 354 which bolt fits in an elongated slot provided in vertical link 352, as shown in Fig. 17. Vertical link 352 is provided with a notch 355, as shown in Fig. 23, and a tension spring 356 is fastened to the lower portion of vertical link 352, as shown in Fig. 17, and is also connected to the outmost end of knife cam 347 so that the spring urges vertical link 352 toward pin 353 so that the pin is within the notch except when link 352 is moved outwardly by cam 326. Link 352 has a bottom piece 357 pivoted to link 352 and link 357 is fastened to an operating link 358 by means of a shaft 359 and said operating link is fastened to housing 191 by a pivot 360. The distal end of operating link 358 is fastened to a solenoid link 361 by means of a pivot 362 which solenoid link is in turn pivoted to solenoid core 363, said solenoid core being controlled by a punch press trip solenoid winding 266.

When the sinuously bent wire is being fed by the serrated wheel 270 beneath punch press cutter head 315, the punch press tripping mechanism is positioned as shown in the full lines of Fig. 17 with the exception of knife cam 347 which is at this time in its dot dash position as depicted in Fig. 17 with the vertical link 352 bearing against punch press cutter wheel 324 because of the tension spring 356, and pin 353 is within notch 355 in the vertical link, as shown in dot dash lines in Fig. 23, knife cam 347 is within slot 325 and also within slot 334 of the punch press cutter dog 328 preventing said dog from being forced out of its hole by spring 329. When control shaft 180 has been rotated by power transmission chain 181 to the point at which cam 300 pushes pivot plate 396 up to close the contacts of timing switch 301, dwell solenoid winding 263 is energized pulling core 262 upward and closing the contacts of punch press trip switch 264 to thereby energize punch press trip solenoid winding 266 pulling core 363 upward which through pivot 360 pulls vertical link 352 downward and pulling knife cam 347 downward thereby allowing spring 329 to push the punch press cutter dog 328 out of its hole where it may contact one of the flywheel dogs 331, as shown in Fig. 20, so that shaft 320 is rotated, head 315 moved downwardly and operations to be described performed. Punch press trip solenoid winding 266 is still energized because the contacts of punch press trip switch 264 are closed by solenoid core 262 and upon rotation of punch press wheel 324 to the extent such that cam surface 326 revolves in a counterclockwise direction, as shown in Fig. 17, until it pushes vertical link 352 outward so that pin 353 is moved out of notch 355 in the vertical link and under the tension of tension spring 356 knife cam 347 is moved upward and back into the slot where its front beveled edge 348 will engage the angular side 337 of punch press dog 328 and move the punch press cutter dog back into its hole against the resistance of spring 329 thereby disengaging the flywheel 194 from the punch press cutter wheel 324 and stopping the movement of head 315 so that said head is positioned at its uppermost position. Head 315 is prevented from overrunning due to its inertia by a friction brake having an arm 369 which is fastened to top housing 321 at 370. Arm 369 is split at its opposite end and formed to enclose the other extreme end of punch press cutter shaft 320 and a leather friction member 371 is imposed between shaft 320 and the split portions of arm 369. A bolt 372 is provided on the split portions of arm 369 and serves to adjust the arm so that various amounts of friction may be obtained and this adjustment is varied until the head 315 stops in its correct position which is its uppermost position.

The punch press cutter head 315 has three large guides 376, 377 and 378 and two small guides 379 and 380 and, as can be seen from Fig. 16, where the head 315 is caused to be in a partially lowered position large guides 376 and 377 when moved downwardly serve to properly position the sinuously bent wire 2 by inserting themselves in the ends of the convolutes and guide 378 is positioned between the legs of the convolute and the small guides 379 and 380 are positioned on the opposite sides of the legs on middle convolute, these guides properly positioning the sinuously bent wire. A punch cutter 381 is provided on head 315, as can best be seen by reference to Fig. 16, and serves when moved down on the sinuously bent wire to stamp out a piece beneath it, as seen in Fig. 16, and the punch cutter is so positioned with respect an end former 382 that the punch cutter first cuts the wire and upon further downward movement of the head 315 the sloping sides of end former 382 first contact the ends of the cut convolute bending it outward which ends are further bent outward upon further downward movement of head 315 around small guides 379 and 380 because of the angular shape of end former 382. In Fig. 16 an angularly shaped slot is provided in cutting and bending table 314 so that the end former may move therein during its end forming operations. Suitable holes are also provided in table 314 to permit the guiding pins to move therein during the positioning operation and a hole is also provided into which the cutter may move during its cutting operation. The schematic circuit diagram, shown in Fig. 25, shows that the main motor 3 may be turned on by main motor switch 385 which switch when actuated serves to allow current to flow from a three phase line L1, L2 and L3. Small motor 193 which is the punch press motor is turned on by manipulating the small motor switch 386 which allows current to flow from three phase line L1, L2 and L3. From the lower part of the diagram it can be seen that limit switch 250 energizes either solenoid on winding 248 or solenoid off winding 249 at all times.

*Operation of the dwell and cutting apparatus*

The dwell and cutting apparatus B has a feeding means, said feeding means having several separate mechanisms such as the timing sprocket apparatus and the feeding apparatus and the overall purpose of this feeding means is to receive sinuously bent wire in non-slack fashion from the wire bending apparatus A and put a longitudinal arc in the wire and push it beneath the cutting head so that springs may be cut from the bent wire stock. The operation of the dwell and cutting apparatus will be explained by reference to circuit diagram, Fig. 25, and timing diagram, Fig. 26.

At the beginning of the cycle it will be seen from the timing diagram that the timing switch 301 is open so that the dwell solenoid, which is energized through this switch is deenergized, the punch press trip switch 264 which is actuated by the core 262 of dwell solenoid 263 is also open and, therefore, the punch press trip solenoid 266 which is energized through punch press trip solenoid 264 is deenergized. The dwell frame 183 is at rest and the clutch on solenoid is deenergized since the dwell frame is at its top position and the clutch off solenoid is energized so that the clutch plates 237 and 242 are not in engagement. At this time power is being transmitted from shaft 182 through power transmission chain 181 to control shaft 180 which control shaft through chain sprocket 291 is rotating time chain 292 and wire is being moved through the narrow arcuate passage created by shoe 275 and wheel 270 by wheel 270, a longitudinal arc being put in said wire and said wire being fed across cutting and bending table 314. When power transmission chain 181 through control shaft 180 has rotated the timing chain 292 until the cam 300 thereon closes the contacts of timing switch 301 the following events occur almost simultaneously, dwell solenoid 263 is energized pulling up core 262 lifting latch 184 and allowing dwell frame 183 to rotate, the rotation of said dwell frame transmitting no power to control shaft 180 thereby stopping wheel 270 from feeding the sinuously bent wire and also stopping the timing chain 292. At the same time core 262 unlatches the dwell frame 183, core 262 also contacts punch press trip switch 264 which energizes punch press trip solenoid 266 thereby allowing dog 328 to come out of its hole, contact one of the flywheel dogs 331 to rotate punch press shaft 320 to move head 315 downwardly. As before set out in the specification, control shaft 180 is prevented from movement during the movement of dwell frame 183 by the load on shaft 180 created by the sinuously bent wire being pushed in the narrow arcuate space. The punch press cutter head 315 moves down, cuts a portion out of the end of the convolute of the sinuously bent wire, forms the ends of the wire and moves back up. Cam 326 during this time is moved around where it can knock vertical link 352 out and let knife cam 347 move back in slot 325 in the punch press wheel 324 so that the beveled edge 348 pulls the punch press dog 328 away from the flywheel dogs 331 disconnecting head 315 from the flywheel. The period of rotation of the dwell frame is so timed as to allow the head 315 to move down and up as described and the friction brake arm 369 insures that the head will not overrun. At about this time, dwell frame 183 has rotated to the point such that arm 254 through arm 251 actuates over the center switch 250 so that clutch on solenoid winding 248 is energized and clutch off solenoid winding 249 is deenergized whereby the clutch plates 237 and 242 are engaged so that the gear train from shaft 182 is connected to the dwell frame and rotates the dwell frame in the opposite direction. Immediately when the dwell frame stops rotating in counterclockwise direction, as viewed in Fig. 11, power is once again transmitted through power transmission chain 181 to control shaft 180 so that cam 300 on timing chain 292 is moved off timing switch 301 so that this timing switch is open and dwell solenoid 263 is deenergized thereby opening the contacts of punch press trip switch 264 and thereby deenergizing punch press trip solenoid 266 which allows the vertical link 352 to move upward so that pin 353 is once more in notch 355. The dwell frame is rotated until shaft 227, which is the latch catch shaft, moves slightly beyond side 260 of undercut 259 on latch 184 at which time arm 254 has moved to such a position that arm 251 snaps over-the-center switch 250 in the other direction thereby deenergizing clutch-on solenoid 248 and energizing clutch-off solenoid 249 disengaging clutch plates 237 and 242. During the interval of time that the dwell frame 183 is returning from its rotated position back to the position shown in Fig. 11, there is a short speed-up of rotation of shaft 180 in that the sprocket 221 swinging about shaft 220 as a center causes the chain 181 to be drawn around sprocket 223 at a slightly faster rate than that at which it would normally be driven from shaft 182. This speed-up or advancement of the shaft 180 exactly compensates for the delay or stoppage of shaft 180 for the time required to effect a cutoff. In this manner, although wire is being constantly delivered at a uniform rate from the oscillating pins 42 and 43 and the sinuous wire is temporarily stopped while it is being cut by the cutoff mechanism the speed-up of the shaft 180 exactly makes up for the lost time occasioned in stopping the sinuous wire it is being cut. This make-up is exactly equal to the loss so that over any number of cycles of operation of the entire machine the amount of wire consumed in the arcing mechanism and in the cutoff mechanism is exactly equal to the amount delivered from the oscillating pins 42 and 43. It is to be noted that when the wire is halted or rested by the rotation of the dwell frame 183 that the sinuously bent wire is still received by the overall feeding means in the dwell and cutting mechanism in non-slack fashion. There is no slack because the time of halt or rest of the sinuously bent wire is very brief and all that occurs during this time is a slight deformation or pressing together of the convolutes which precede the wheel 270 and when the wheel 270 is caused to rotate, the sinuously bent wire springs back to its normal sinuous shape and is fed under the cutting mechanism.

The above conditions with the dwell frame 183 under shaft 227 and with sinuously bent wire being fed by wheel 270 across the cutting and bending table 314 continues until control shaft 180 has rotated chain sprocket 291 until cam 300 on timing chain 292 once again closes the contacts of timing switch 301 at which time the dwell and cutting processes are repeated.

As can be seen from the diagram, there is a slight delay from the time that the contacts of timing switch 301 are closed to the time that the punch press switch solenoid is energized and this delay is caused by the time necessary for the dwell solenoid to move up and close the contacts on punch press trip switch 266. There is another slight delay during which the cutting head 315 is moving downwardly before the wire is cut and the ends thereof bent properly and these delays serve to insure that the sinuously bent wire will be at full rest when operated on so that the guides 376, 377, 378, 379 and 380 may properly position the wire on cutting and bending table 314.

Various changes may be made in the details of construction without departing from the spirit and scope of the invention as defined by the appended claims.

I claim:

1. A machine for bending wire into zigzag shape having a frame on which is mounted a movable platform, means for causing said platform to have a simple harmonic oscillating motion, reciprocating means for guiding wire over said platform and moving the wire back and forth across said platform, a pair of pins on said platform in spaced relation for contacting the wire on opposite sides thereof and bending it into zigzag shape, said reciprocating means being synchronized with said oscillating platform so that when said platform moves in a direction as to cause said pins to bend the wire, said reciprocating means moves away from the pin which first contacts the wire leaving the reciprocating means, and when the pins are moved in a direction as to retreat from a portion of the wire just bent, said reciprocating means moves in the same general direction as the pin closest it whereby the bent wire is moved across said platform in a manner such as to permit said pins to move around the portion of the wire previously bent to put an opposed bend in the wire, a retainer pin, means for moving said retainer pin including a rotating shaft, a crank mounted on said shaft, a crank arm connected to said crank and to said retainer pin, means to guide said retainer pin toward and away from said oscillating platform, the rotation of said shaft being synchronized with the oscillation of said platform and the ratio of the length of the crank to the length of the crank arm being such with respect to the radius about the axis of oscillation of the oscillating pins, that during rotation of said shaft, said retainer pin is so moved toward said platform during a bending operation that said retainer pin tracks each oscillating pin on alternate oscillations of said platform, said retainer pin when moved toward said oscillating platform clamping a portion of the previously bent wire between it and the oscillating pin last mentioned to prevent the rest of the bent wire from weaving during the bending operation and allowing the oscillating pins and said reciprocating means to perform all the bending operation.

2. In a machine for bending wire into sinuous form having a support, a pair of bending pins, means mounting said pins and carried by said support for oscillating said pins about an axis between them through arcs of approximately 360 degrees, means for oscillating said last means, means on said support for guiding wire to said bending pins, a retainer pin, means for moving said retainer pin in a path from a point outside the plane of the formed convolution of the wire into said plane into contact with each last formed convolution, a projection of said path in the plane of the wire being generally in the direction of the wire feed, and means carried by said support for moving said retainer pin in said path in timed relation to the oscillation of said pins.

3. A wire bending machine for bending wire into sinuous form comprising a support, a pair of spaced bending pins, means mounting said bending pins on said support for oscillation about an axis between the bending pins, means for oscillating the bending pins about said axis through arcs of approximately 360 degrees, means on said support for guiding wire toward the bending pins so as to be bent thereby, a retainer pin, means for moving said retainer pin in a path from a point outside the plane of the formed convolution formed in the wire by the bending pins into the plane thereof and into contact with each last formed convolution, a projection of said path in the plane of the convoluted wire being generally in the direction of the wire feed, and means carried by said support for moving said retainer pin in said path in timed relation to the oscillation of said pins.

4. A wire bending machine for bending wire into sinuous form comprising a support, a pair of spaced bending pins mounted upon said support for rotary oscillation about an axis therebetween, means on the support for oscillating the bending pins about said axis, means disposed in advance of said bending pins for guiding wire to be bent in a general direction toward said axis so as to be engaged by said pins and bent laterally thereby, a retainer pin mounted on said support and disposed rearwardly of the bending pins for movement toward and away from said axis and into and out of the plane for oscillation of the bending pins, and means on said support for moving the retainer pin in timed relation to the oscillation of the bending pins whereby the retainer pin may move toward said axis and into the plane of oscillation of the bending pins to engage each convolution as its formation by the bending pins nears completion and then recede from said axis and from said plane of oscillation to permit the completed convolution to pass therebeneath.

5. A wire bending machine for bending wire into sinuous form comprising a support, a pair of spaced bending pins mounted upon said support for rotary oscillation about an axis therebetween, means disposed in advance of the bending pins for guiding wire in a general direction toward said axis so as to be engaged by said pins and bent laterally thereby, means on said support for oscillating said bending pins through arcs of approximately 360 degrees which terminate when the pins are on a line at approximately right angles to the general direction of wire movement, a retainer pin mounted on said support and disposed rearwardly of the bending pins for movement toward and away from said axis and into and out of the plane of oscillation of the bending pins, and means on said support for moving the retainer pin in timed relation to the oscillation of the bending pins whereby the retainer pin may move toward said axis and into the plane of oscillation of the bending pins to engage each convolution in the wire as its formation by the bending pins nears completion and then recede from said axis and from said plane of oscillation to permit the completed convolution to pass therebeneath.

6. In a wire bending machine for bending wire into sinuous form, a support, a pair of spaced bending pins mounted on said support for rotary oscillation about a stationary axis therebetween, a reciprocable guide means mounted on said support in advance of said bending pins for guiding wire to be bent in a general direction toward said axis so as to be engaged by the bending pins and bent laterally thereby, means on said support for oscillating said bending pins through arcs of approximately 360 degrees which terminate on a line arranged at approximately right angles to the general direction of wire movement, means on said support for reciprocating said guide means in a direction transverse to the general direction of wire movement and in such timed relation to the oscillation of the bending pins that during a portion of each reciprocation of the guide means it is moving sympathetically with the rotary oscillation of the bending pins and during the remainder of the reciprocation it is moving in a direction opposed thereto, a retainer pin mounted on said support and disposed rearwardly of the bending pins for movement toward and away from said axis and into and out of the plane of oscillation of the bending pins, and means on said support for moving the retainer pin in timed relation to the oscillation of the bending pins whereby the retainer pin may move toward said axis and into the plane of oscillation of the bending pins to engage each convolution as its formation by the bending pins nears completion, and then recede from said axis and from said plane of oscillation to permit the completed convolution to pass therebeneath.

7. In a wire bending machine for bending wire into sinuous form, a support, a pair of spaced bending pins mounted on said support for rotary oscillation about a stationary axis therebetween, a reciprocable glide means mounted on said support in advance of said bending pins for guiding wire to be bent in a general direction toward said axis so as to be engaged by the bending pins and bent laterally thereby, means on said support for oscillating said bending pins through arcs of approximately 360 degrees which terminate on a line arranged at approximately right angles to the general direction of wire movement, means on said support for reciprocating said guide means in a direction transverse to the general direction of wire movement and in such timed relation to the oscillation of the bending pins that during a portion of each reciprocation of the guide means it is moving sympathetically with the rotary oscillation of the bending pins and during the remainder of the reciprocation it is moving in a direction opposed thereto, a retainer pin, means reciprocable on said support toward and away from said axis on which the retainer pin is pivotally mounted, links pivotally connected to the retainer pin and to said support for causing the retainer pin to move into and out of the plane of oscillation of the bending pins as the retainer pin is reciprocated, and means for reciprocating the mounting means for the retainer pin in timed relation to the oscillation of the bending pins whereby the retainer pin may move toward said axis and into the plane of oscillation of the bending pins to engage each convolution as its formation by the bending pins nears completion and then recede from said axis and from said plane of oscillation to permit the completed convolution to pass therebeneath.

HARRY H. NORMAN.

References Cited in the file of this patent

UNITED STATES PATENTS

| Number | Name | Date |
|---|---|---|
| 468,301 | Cooper | Feb. 2, 1892 |
| 488,941 | Koss | Dec. 27, 1892 |
| 566,379 | Deck | Aug. 25, 1896 |
| 1,275,984 | Bailey | Aug. 13, 1918 |
| 1,384,339 | Powell | July 12, 1921 |
| 1,473,094 | Hawker | Nov. 6, 1923 |
| 1,499,135 | Wolf | June 24, 1924 |
| 1,558,526 | Witte | Oct. 27, 1925 |
| 1,562,997 | Van Orman | Nov. 24, 1925 |
| 1,676,215 | Frentzel | July 3, 1928 |
| 2,103,142 | Bowers | Dec. 21, 1937 |
| 2,160,020 | Horton | May 30, 1939 |
| 2,188,406 | Horton | Jan. 30, 1940 |
| 2,194,503 | Kaestner | Mar. 26, 1940 |
| 2,220,872 | Toop | Nov. 5, 1940 |
| 2,245,407 | Lignian | June 10, 1941 |
| 2,331,294 | Bank | Oct. 12, 1943 |
| 2,454,290 | Payne | Nov. 23, 1948 |
| 2,582,576 | Zweyer | Jan. 15, 1952 |

FOREIGN PATENTS

| Number | Country | Date |
|---|---|---|
| 23,260 | Great Britain | Oct. 20, 1906 |